US011966346B2

(12) United States Patent
Renard et al.

(10) Patent No.: US 11,966,346 B2
(45) Date of Patent: Apr. 23, 2024

(54) METHOD AND SYSTEM FOR MAKING FUNCTIONAL DEVICES AVAILABLE TO PARTICIPANTS OF MEETINGS

(71) Applicant: BARCO N.V., Kortrijk (BE)

(72) Inventors: Gauthier Renard, Kuurne (BE); Johan Peter Frans Degraef, Ghent (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/771,068

(22) PCT Filed: Dec. 21, 2018

(86) PCT No.: PCT/EP2018/086537
§ 371 (c)(1),
(2) Date: Jun. 9, 2020

(87) PCT Pub. No.: WO2019/129696
PCT Pub. Date: Jul. 4, 2019

(65) Prior Publication Data
US 2021/0191893 A1 Jun. 24, 2021

Related U.S. Application Data

(63) Continuation of application No. 15/858,668, filed on Dec. 29, 2017, now Pat. No. 10,684,972.

(51) Int. Cl.
G06F 13/38 (2006.01)
G06F 13/12 (2006.01)
(Continued)

(52) U.S. Cl.
CPC .......... G06F 13/387 (2013.01); G06F 13/122 (2013.01); G06F 13/4282 (2013.01); H04L 12/12 (2013.01); H04L 63/0428 (2013.01)

(58) Field of Classification Search
CPC .. G06F 13/122; G06F 13/387; G06F 13/4282; H04L 12/12; H04L 12/0428; H04L 12/1813
See application file for complete search history.

(56) References Cited

U.S. PATENT DOCUMENTS 7,617,342 B2 11/2009 Rofougaran
7,761,627 B2 7/2010 Christison
(Continued)

FOREIGN PATENT DOCUMENTS

CN 104412542 A 3/2015
CN 106412683 A 2/2017
(Continued)

OTHER PUBLICATIONS

Office Action issued in European Patent Application No. 18833045.0, dated Jun. 28, 2021.
(Continued)

Primary Examiner — Brian T Misiura
(74) Attorney, Agent, or Firm — HSML P.C.

(57) ABSTRACT

A system and method for connecting a processing device to a functional device connected to or in a base unit of a communications network, the base unit having a transmitter and the processing device having a memory, a display and an operating system. A first peripheral device is adapted to be coupled to the processing device via a generic communications protocol, the first peripheral device having a receiver and at least one fixed or configurable endpoint of the functional device exposed on the first peripheral device. The base unit and the first peripheral device is adapted to transmit and receive data respectively over the communications network from the functional device to the processing device via the at least one fixed or configurable endpoint using the generic communications protocol for communica-
(Continued)

tion between the processing device and the first peripheral device.

22 Claims, 19 Drawing Sheets

(51) Int. Cl.
  *G06F 13/42* (2006.01)
  *H04L 9/40* (2022.01)
  *H04L 12/12* (2006.01)

(56) References Cited

U.S. PATENT DOCUMENTS

| | | | |
|---|---|---|---|
| 8,316,138 | B2 | 11/2012 | Chang |
| 8,756,348 | B2 | 6/2014 | Beel |
| 8,896,656 | B2 | 11/2014 | Epstein |
| 9,083,769 | B2 | 7/2015 | Beel |
| 9,129,602 | B1 | 9/2015 | Shepard et al. |
| 9,183,164 | B2 | 11/2015 | Brabenac |
| 9,201,826 | B2 | 12/2015 | Huang |
| 9,538,138 | B2 | 1/2017 | Leete |
| 9,722,986 | B2 | 8/2017 | Brands et al. |
| 9,804,977 | B2 | 10/2017 | Ghosh |
| 9,934,168 | B2 | 4/2018 | Griffin |
| 10,031,873 | B2 * | 7/2018 | Hundal ................. G06F 13/385 |
| 2002/0196378 | A1 | 12/2002 | Slobodin et al. |
| 2004/0010464 | A1 | 1/2004 | Boaz |
| 2004/0236547 | A1 | 11/2004 | Rappaport et al. |
| 2006/0075100 | A1 | 4/2006 | Stirbu |
| 2007/0005809 | A1 | 1/2007 | Kobayashi et al. |
| 2009/0198839 | A1 | 8/2009 | Banerjee |
| 2010/0115145 | A1 | 5/2010 | Banerjee |
| 2010/0302130 | A1 | 12/2010 | Kikuchi |
| 2014/0148152 | A1 | 5/2014 | Periyalwar et al. |
| 2014/0181325 | A1 | 6/2014 | Hundal et al. |
| 2014/0362161 | A1 | 12/2014 | Leete |
| 2015/0121466 | A1 * | 4/2015 | Brands ................ H04L 12/1818 726/4 |
| 2015/0169477 | A1 * | 6/2015 | Beel .................... H04N 21/4126 710/10 |
| 2015/0263905 | A1 * | 9/2015 | Beel ........................ H04L 51/00 715/753 |
| 2015/0364274 | A1 | 12/2015 | Khattak |
| 2016/0092153 | A1 | 3/2016 | Demik |
| 2016/0125838 | A1 | 5/2016 | Hundal et al. |

FOREIGN PATENT DOCUMENTS

| | | |
|---|---|---|
| EP | 1879143 A2 | 1/2008 |
| EP | 3099009 A1 | 11/2016 |
| JP | 2015011679 A | 1/2015 |
| JP | 2016178422 A | 10/2016 |
| WO | 2008011727 A1 | 1/2008 |
| WO | 2008080107 A2 | 7/2008 |
| WO | 2012128972 A1 | 9/2012 |
| WO | 2013037980 A2 | 3/2013 |

OTHER PUBLICATIONS

International Search Report in corresponding PCT/EP2018/086537 dated Apr. 10, 2019.
Written Opinion in corresponding PCT/EP2018/086537 dated Apr. 10, 2019.
International Preliminary Report on Patentability in corresponding PCT/EP2018/086537 dated Nov. 21, 2019.
Barco—Clickshare Brochure, Nov. 2018 (20 pages).
Notice of Reason for Refusal issued in corresponding Japanese Application No. 2020-536065, dated Nov. 4, 2021, with English translation.
Office Action issued in Chinese Application No. 201880084464.1, dated Jan. 26, 2022, with machine tranlation.
Communication issued in European Application No. 18 833 045.0, dated Mar. 14, 2022.
Wireless USB, from Wikipedia page, last edited on Dec. 22, 2017, 11 pages provided.
Written Opinion issued in corresponding Singapore Application No. 11202005201Y, dated May 23, 2022.
Office Action issued in Indian Application No. 202017017906, dated Jul. 4, 2022, with English translation.
Notice of Grounds of Rejection issued in corresponding Japanese Application No. 2020-536065, dated Aug. 16, 2022, with English machine translation.
"Skype for Business" Skype for Business product brochure, Microsoft Japan, Oct. 29, 2015, with partial translation.
Office Action issued in U.S. Appl. No. 17/675,641, dated Oct. 27, 2022.
Icron WiRanger Cable USB 2.0 Hub User Guide, by Icron Technologies Corporation, www.icron.com.
Observations by a third party in European Application No. 18833045.0, dated Feb. 17, 2023.
Office Action issued in European Application No. 18833045.0, dated Feb. 1, 2023.
Office Action in Chinese Application No. 201880084464.1, dated Jan. 19, 2023, with machine translation.
Written Opinion issued in parallel Singapore patent application No. 11202005201Y, dated May 10, 2023, 8 pages provided.
Office Action issued in U.S. Appl. No. 17/742,166, dated May 9, 2023.
Observations by a third party in European Application No. 18833045.0, dated Aug. 2, 2023.
Communication issued in European Application No. 18833045.0, dated Sep. 1, 2023.
Office Action issued in U.S. Appl. No. 17/664,147, dated Sep. 13, 2023.
Chae et al., "Wireless Webcam Implementation and Application Utilizing Wireless USB Technology", Journal of the Korea Institute of Information and Communication Engineering, vol. 18, No. 3 : 569~575 Mar. 2014, with English translation.
The extended European search report issued in European Application No. 23192763.3, dated Nov. 30, 2023.
The communication pursuant to Art(3) in European Application No. 23192763.3, dated Mar. 5, 2024.

* cited by examiner

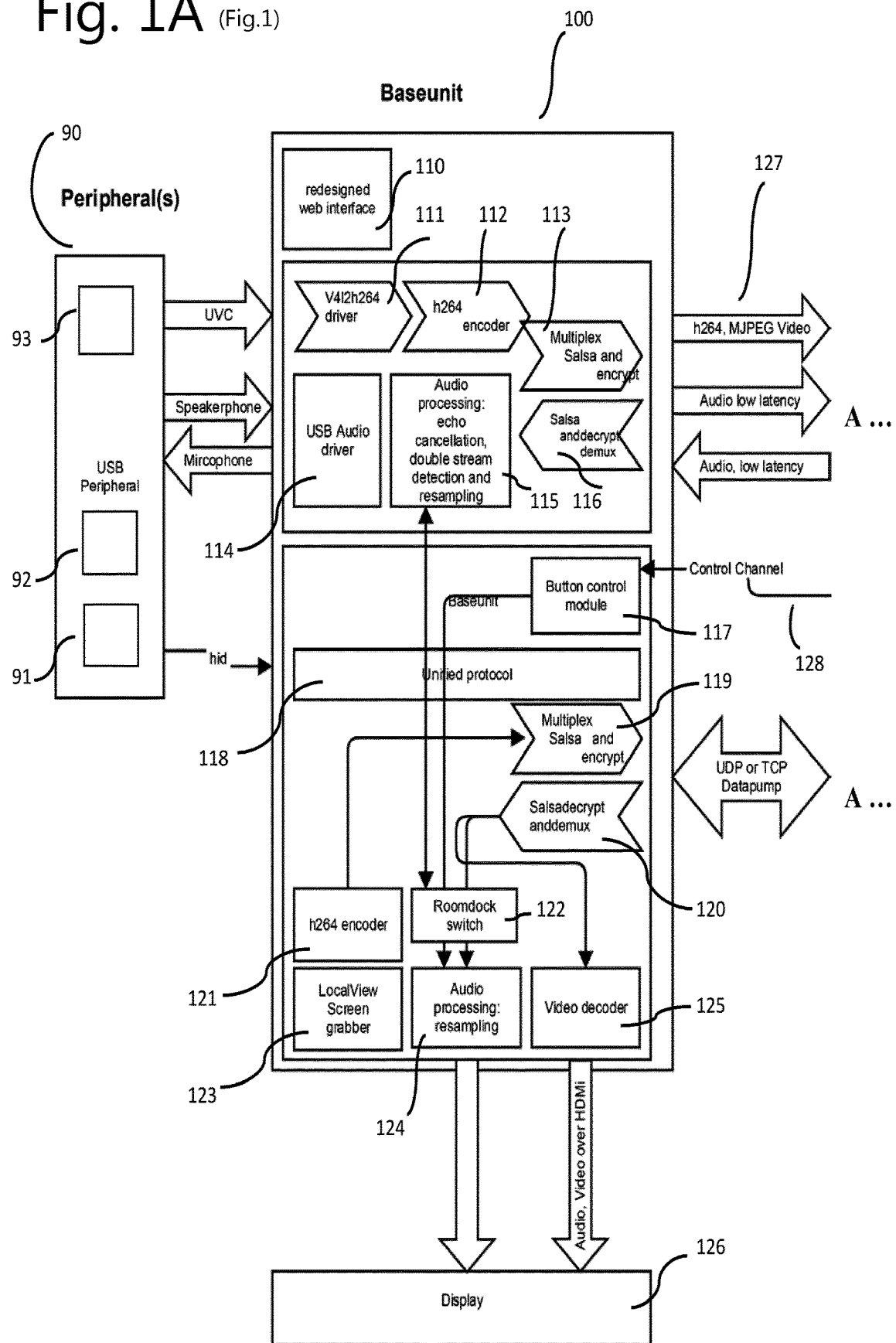
Fig. 1A (Fig.1)

(Fig.1 continued)

Fig. 1C (Fig.1 continued)
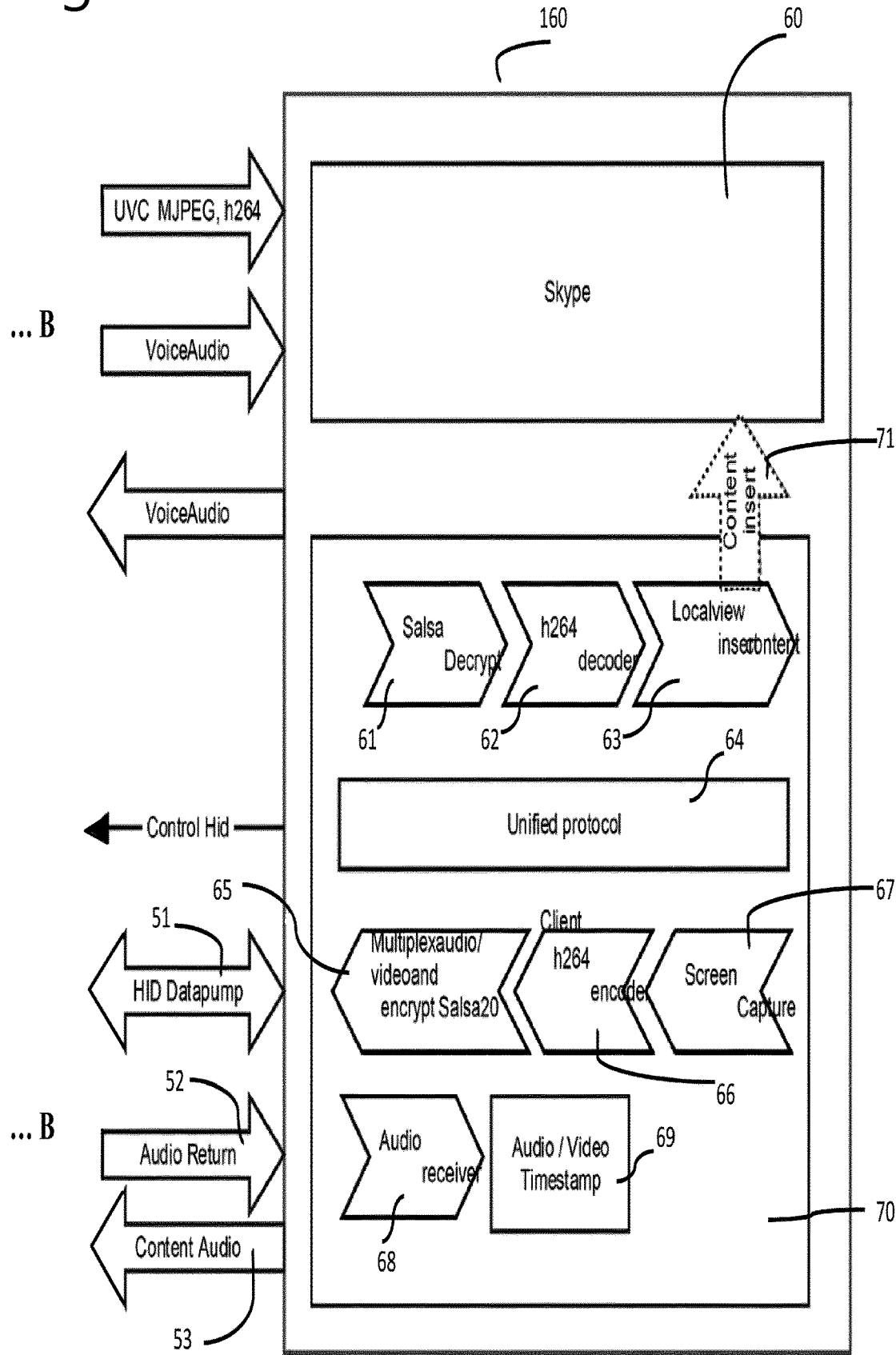

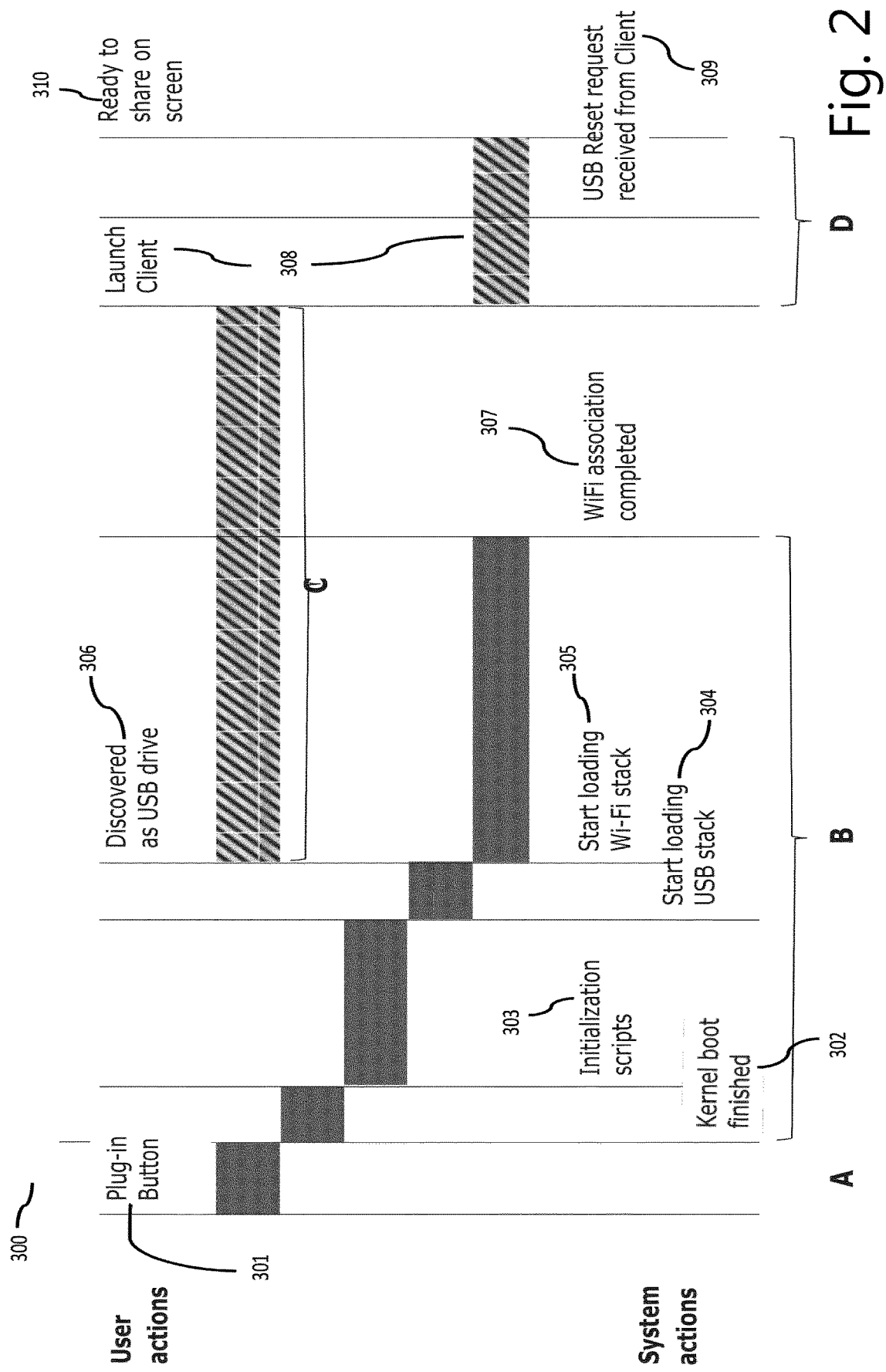

METHOD AND SYSTEM FOR MAKING FUNCTIONAL DEVICES AVAILABLE TO PARTICIPANTS OF MEETINGS

The present invention relates to methods, devices and systems for making functional devices available to participants of meetings, as well as software for carrying out such methods.

BACKGROUND

Allowing ad hoc groups of persons to communicate with each other is one of the fundamental aspects of collaboration, problem solving, negotiation, teaching and education, etc. To assist in communication, there has been an explosion of electronic communication tools such as electronic conferencing tools, e.g. synchronous and asynchronous conferencing, online chat, Instant Messaging, audio conferencing, videoconferencing, data conferencing, application sharing, remote desktop sharing, electronic meeting systems, collaborative management (coordination) tools, project management systems, knowledge management systems, and social software systems.

One classic approach is the lecture or seminar often involving a presentation using presentation software. To a large extent the traditional single person presentation or lecture has been maintained with the audience being in a rather passive mode as far as determining, constructing, augmenting or modifying the information to be presented is concerned.

As with other business processes, meetings are going digital. Increasingly, people are using computer technology alone and in conjunction with broadband networks to support their meeting objectives prior to and during an actual meeting. For example, e-mail is used to pass around files for people to read prior to a meeting.

However, certain functionalities such as microphones and load speakers tend to have a low quality if these are provided by portable devices such as laptops and mobile phones. As meetings get larger in size there is a need for high quality audio as well as visual signals to be made available to participants at a meeting.

SUMMARY OF THE INVENTION

Embodiments of the present invention relate to methods, devices and systems for making functional devices available to participants of meetings, as well as software for carrying out such methods.

Embodiments of the present invention provide a system for connecting a processing device to a functional device connected to or in a base unit of a communications network, the processing device having a memory, a display and an operating system, the system comprising:

a first peripheral device being adapted to be coupled to the processing device via a generic communications protocol, the base unit having a transmitter and the first peripheral device having a receiver and at least one fixed or configurable endpoint of the functional device exposed on the first peripheral device;

the base unit and the first peripheral device being adapted to transmit and receive data respectively over the communications network from the functional device to the processing device via the at least one fixed or configurable endpoint using the generic communications protocol for communication between the processing device and the first peripheral device.

The communications network is preferably a wireless network. This enables the sharing or combining of at least a selection of functionalities/endpoints of the secondary peripheral devices, i.e. the one-to-many scenario.

The data that is transmitted or received, i.e. streaming data carrying images, audio, etc. can be in a raw or unaltered format.

There can be more than one first peripheral device. For example, the data can be transmitted from the functional device to at least two processing devices using at least two first peripheral devices.

A functional device can be run with a vendor specific driver alone.

The functional device can be a data generating device such as any one or more of a microphone, a speakerphone, a speaker, a display, a touchscreen, a projector, a camera, a video camera, a webcamera.

The at least one fixed or configurable endpoint of the functional device exposed on the first peripheral device can be a human interface device.

The processing device can be adapted to communicate with the at least one fixed or configurable endpoint with the pre-installed generic driver being a human interface device driver.

The at least one fixed or configurable endpoint of the functional device exposed on the first peripheral device can be a mass storage device.

The processing device can be adapted to communicate with the at least one fixed or configurable endpoint with a pre-installed generic driver being a mass storage device driver.

The at least one fixed or a configurable endpoint of the functional device exposed on the first peripheral device can be a composite device.

The processing device can be adapted to communicate with the at least one fixed or configurable endpoint with a pre-installed generic driver being a composite device driver.

Embodiments of the present invention include the combining of endpoints: the present invention includes a system wherein two endpoints are combined and exposed to the processing device as one endpoint.

An exposure or enumeration feature determines which endpoints the first peripheral (e.g. button) sees. With respect to exposure this can be done with descriptor fields. A specific device can expose a peripheral device or other device. This means that the specific device configures one or more endpoints with specific descriptor fields or descriptive field. An endpoint is defined by a number of descriptive fields.

A basic form of descriptive fields can be "USB over IP", and the actual transfer of the unaltered data can be done with tunneling.

The exposure can be implemented with descriptor fields. The Endpoints are the capabilities/functionalities of the physical devices (second peripherals, or functional device), e.g. a telephone device is a second peripheral while it can have several endpoints, e.g. a microphone or a loudspeaker or an IP connection, etc.

The differentiation between endpoints and second peripherals/functional devices defines endpoints.

Embodiments of the present invention provide a system that enables the use of the original vendor's driver for each functional device (and related endpoint), e.g. in the context of minoring. Hence the functional devices can be run with the vendor specific driver alone.

The system can comprise means for encoding, optionally encrypting the data. Hence the system may comprise an encoder for encoding, optionally encrypting the data.

The processing device can be adapted to host a unified communication between two or more processing devices. The unified communication can be a Skype™ call or a Skype™ for Business call. The first peripheral device can be adapted to present the functional device to the unified communication between two or more processing devices. For example, the functional device can be a speaker phone, a microphone, a speaker, a videocamera, a webcam, a camera, or other audio source.

The system can be adapted to share data from other processing devices in a meeting in the call. A manual action can be used to activate this sharing to be performed by the person sharing or the host via local view window.

The system can be adapted to select of a camera, e.g. via a manual action in UC clients. The system can be adapted to synchronize the sharing state of the first peripheral device with the sharing state of the UC client.

Sharing of functionalities/endpoints can be sharing of a room display. Combining of resources can be using two room loudspeakers (e.g. to increase quality) but the user only sees "one room loudspeaker". The latter case would also comprise the combining feature if there are more than one participant/user in the room. Sharing is also envisioned as a selection of functionalities/endpoints of a certain functional device.

Embodiments of the present invention can use multiple endpoints, at least one fixed or configurable endpoint and the sharing can be to multiple processing devices, i.e. the use of multiple first peripherals (e.g. buttons) is also supported.

The system can be adapted to provide a multiuser wireless speakerphone. The speakerphone can be made accessible to every processing device in a meeting with a first peripheral device connected to each of the processing devices. There is no moderation or need to perform an action to get access to this device.

The system can be adapted to provide separate controls, e.g. on the peripheral device to control a volume of an audio output of the Base Unit and to mute a room microphone. When muted, a microphone can also be muted for all other first peripheral devices connected to processing devices in a meeting.

Audio signals should be picked up by a microphone or the Base Unit can be adapted to have to inject audio signals in any audio feed such as in a microphone signal to a first peripheral device connected to a processing device.

The system can be adapted to expose the same type of functional device to the user as is connected to the Base Unit so that a user can use drivers provided by a vendor of the functional device installed on the processing device.

The system can be adapted such that for a plurality of processing devices communicating with the Base Unit, a functional device connected to the base unit will be exposed to all the plurality of processing devices. The functional device can be exposed natively.

Exposure can be implemented with descriptor fields.

The system can be adapted to allow any processing device connected to the communications network through the first peripheral device the ability to view any audiovisual content that is displayed, provided or projected in the meeting room on that processing device called "local view".

A processing device which is a receiver of the local view can have, but is not limited to, following functionality:
The ability to open a window and view the meeting room content in there.
The ability to zoom into the content.
The local view can allow the user to start and/or participate in a blackboard or annotation session from his/her own processing device The system can be adapted provide alternative methods and systems if there are too few first peripheral devices in a certain meeting room.

The system can be adapted to provide a warning if a first peripheral device is attempting to connect to the wrong base unit.

In another aspect the present invention provides a method for connecting a processing device to a functional device connected to or in a base unit of a communications network, the processing device having a memory, a display and an operating system, the base unit having a transmitter and the first peripheral device having a receiver the method comprising: coupling a first peripheral device being to the processing device via a generic communications protocol, providing at least one fixed or a configurable endpoint of the functional device exposed on the first peripheral device;

transmitting data from the base unit and receiving the data at the first peripheral device over the communications network from the functional device to the processing device via the at least one fixed or configurable endpoint using the generic communications protocol for communication between the processing device and the first peripheral device.

The communications network is preferably a wireless network. This enables the sharing or combining of at least a selection of functionalities/endpoints of the secondary peripheral devices, i.e. the one-to-many scenario.

The data that is transmitted or received, i.e. streaming data carrying images, audio, etc. can be in a raw or unaltered format.

There can be more than one first peripheral device. The data can be transmitted from the functional device to at least two processing devices using at least two first peripheral devices.

A functional device can be run with a vendor specific driver alone.

The functional device can provide any one or more of a microphone, a speakerphone, a speaker, a display, a touchscreen, a projector, a camera, a video camera, a webcamera.

The method can include presenting the at least one fixed or a configurable endpoint of the functional device exposed on the first peripheral device as one of a human interface device, a mass storage device, a composite device, a microphone, a speakerphone, a speaker, a display, a touchscreen, a projector, a camera, a video camera, or a webcamera.

The data can be encoded, and/or optionally encrypted.

A unified communication between two or more further processing devices can be hosted on the processing device.

The first peripheral device can present a functional device to the unified communication between two or more processing devices.

The method can include exposing the same type of functional device to the processing device as is connected to the Base Unit and using at least one driver for the functional device installed on the processing device.

Exposure can be implemented with descriptor fields.

In another aspect a peripheral device adapted to be coupled to a processing device via a generic communications protocol is provided, the peripheral device having a receiver and at least one fixed or a configurable endpoint of a functional device exposed on the first peripheral device;

the receiver of the first peripheral device being adapted to receive data over the communications network from the functional device and for sending the data to the processing device via the at least one fixed or configurable endpoint using the generic communications protocol for communication between the processing device and the peripheral device.

The communications network is preferably a wireless network. This enables the sharing or combining of at least a selection of functionalities/endpoints of the secondary peripheral devices, i.e. the one-to-many scenario.

The at least one fixed or a configurable endpoint of the functional device exposed on the first peripheral device can be one of a human interface device, a mass storage device, a composite device, a microphone, a speakerphone, a speaker, a display, a touchscreen, a projector, a camera, a video camera, or a webcamera. The exposure can be implemented with descriptor fields.

A functional device can be run with a vendor specific driver alone.

In another aspect, a computer program product is provided for carrying out any of the method steps of claim 10 when executed on a processor. A non-transitory signal storage means can be used to store the computer program. The non-transitory signal storage means can be an optical disk such as a CD-ROM or a DVD-ROM, a magnetic disk such as a hard disk, a solid state memory such as a flash memory, a magnetic tape or similar.

BRIEF DESCRIPTION OF THE DRAWINGS

FIGS. 2 and 3 show message flows of how a peripheral device is connected to a processing device in embodiments of the present invention.

DEFINITIONS

Figure 1B:
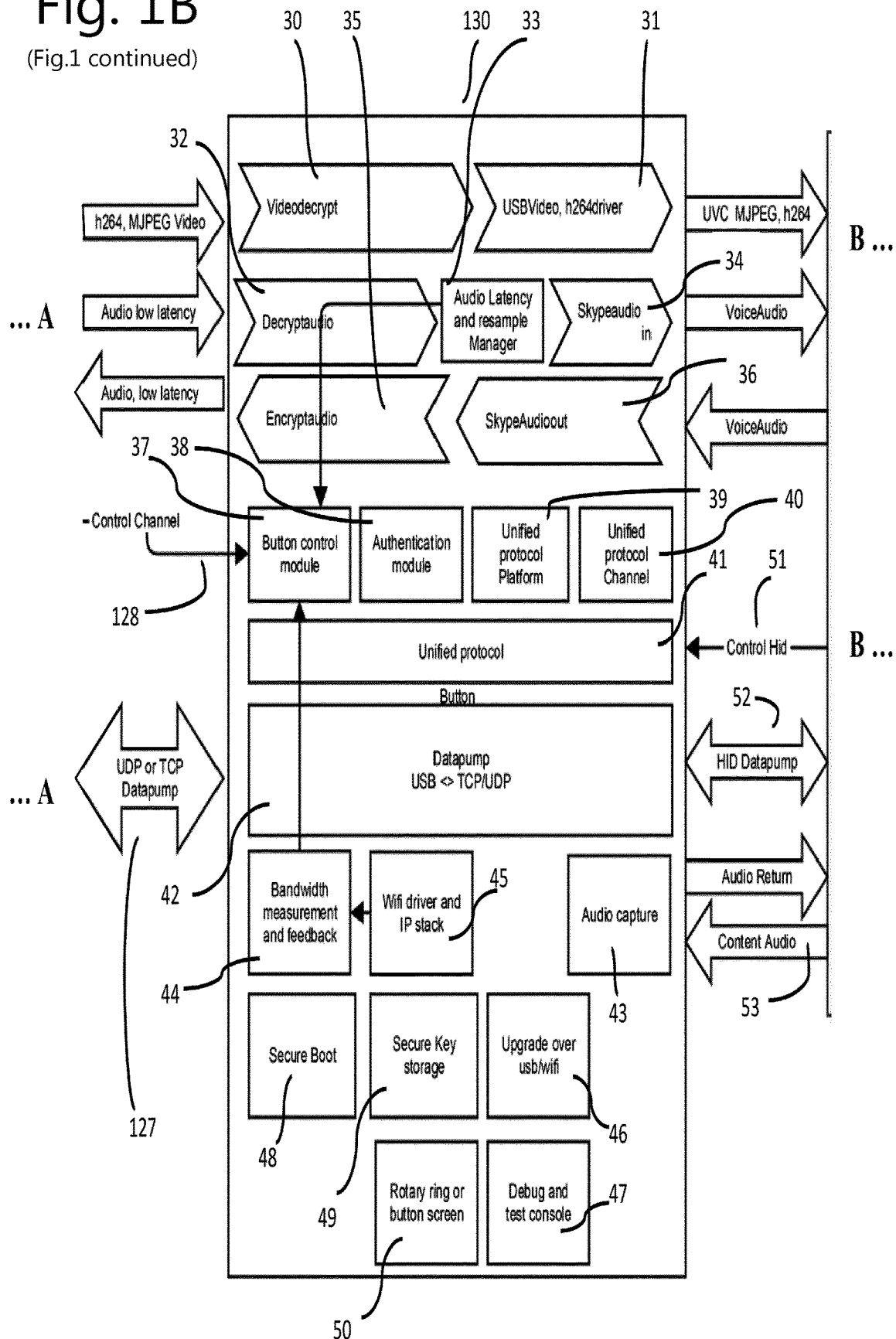
FIG. 1 shows in FIGS. 1A to C an embodiment of the present invention.

"Plug and play" is a term used to describe the characteristic of a computer bus, or device specification, which facilitates the discovery of a hardware component in a system, without the need for physical device configuration, or user intervention in resolving resource conflicts. Plug and play devices can be added to a bus of a computing system (while running or when shut down), and the newly added device and possibly the rest of the computing system is automatically configured to make the newly added device work, both from hardware and from software perspective.

Plug and play interfaces include for example (not an exhaustive list): Firewire (IEEE-1394), PCI, Mini PCI, PCI Express, Mini PCI Express, PCMCIA, PC Card, Universal Serial Bus (USB), SDIO cards, HDMI, DisplayPort, Bluetooth etc.

"Auto-configuration" is the automatic configuration of devices without manual intervention, without setting any switches or jumpers, and without any need for software configuration. An example of auto-configuring devices: USB devices. Examples of auto-configuring protocols: DHCP, Zeroconf, Bonjour.

A plug and play device has auto-configuration software by default to make it plug and play. Example: USB devices are made to be plug and play by including the correct auto-configuration software (e.g. host driver, host stack, application software). Autoconfiguration can also refer to a software alone and is not restricted to a physical device.

"Hot swapping and hot plugging" are terms used to describe the functions of replacing computer system components without shutting down the system. More specifically, hot swapping describes replacing components without significant interruption to the system, while hot plugging describes the addition of components that would expand the system without significant interruption to the operation of the system. A well-known example of this functionality is the Universal Serial Bus (USB) that allows users to add or remove peripheral components such as a mouse, keyboard, or printer. Other examples are eSATA, PCIe, FireWire, for example.

A "portable application" (portable app), sometimes also called standalone, is a computer software program designed to run without installation on the target machine. This type of application is stored on a removable storage device such as a CD, USB flash drive, flash card, or floppy disk—storing its program files, configuration information and data on the storage medium alone. It is a program that can be stored on an electronic device such as a USB flash drive, iPod, memory card, portable hard drive or other portable electronic device and runs on a computer or other processing device coupled to the electronic device without making permanent configuration changes to the host computer. All such programs have a zero-footprint, meaning all temporary files, registry entries, and any other changes to the machine exist only while the program is running.

To be considered a portable application, for purpose of this invention, a software program must:

Not require any kind of formal installation onto a computer's permanent storage device to be executed, and can be stored on a removable storage device such as USB flash drive, iPod, memory card, portable hard drive or other portable electronic storage device thus enabling it to be used on multiple computers.

Settings are stored with, and can be preferably carried around with, the software (i.e., they are written to the electronic device such as a USB drive). Settings are not stored to the registry or any other central system database of the computer.

Leaves a zero (or near-zero) "footprint" on any PC it is run on after being used. i.e., all temporary files/registry settings should be either avoided or at least removed once the program has exited, and files created by the user can be saved directly to the same removable media as the application is stored on.

A portable application does not leave its files or settings on the host computer on which it runs. For example, the application does not write to the Windows registry or store its configuration files (such as an INI file) in the user's profile; instead, it stores its configuration files in the program's directory. Another requirement, since file paths will often differ on changing computers due to variation in Windows drive letter assignments, is the need for applications to store them in a relative format. Preferably, such a program does not require a launcher program to copy necessary settings and files to the host computer when the application starts and move them back to the application's directory when it closes as this may leave a residue on the hard drive in case of power failure.

"Electronic meeting systems" (EMS) need to be distinguished on the one hand from classic groupware, on the other from web conferencing systems. In reality, there is some overlap between minor features of products of the named categories. The main difference from groupware is the intensity of collaboration. EMS should be distinguished from systems with which it is possible to show the contents of an individual computer screen on a remote display with multiple users at the same time.

"Groupware" supports collaboration within groups where the individual contributions remain identifiable. In contrast, EMS enables the group to cooperatively produce a result for which the group is responsible as a whole. In a business process, groupware and electronic meeting systems complement each other: Groupware supports teams when researching and creating documents in the run up to an EMS session or when implementing the results of such a session.

"Web conferencing systems" and "electronic meeting systems" complement each other in the online meeting or workshop: EMS extends the web conferencing system by providing interactive tools for producing and documenting group results. On the other hand, "web conferencing systems" complement EMS with the screen sharing and voice conferencing functionality required in synchronous online meetings and not present in EMS.

"Data conferencing" refers to a communication session among two or more participants sharing computer data in real time. Interaction and presentation devices such as a screen, keyboard, mouse, camera, etc. can be shared. It is a term used to distinguish from video conferencing and audio conferencing. The data can include screen, documents, graphics, drawings and applications that can be seen by the participants of the meeting.

"Application sharing" is an element of remote access, falling under the collaborative software umbrella, that enables two or more users to access a shared application or document from their respective computers simultaneously in real time. Generally, the shared application or document will be running on a host computer, and remote access to the shared content will be provided to other users by the host user. Application sharing should be distinguished from systems in which collaboration on the applications between different users is not possible, but the contents of individual computer screens can be projected onto a remote display with multiple users at the same time.

The term "arbitrary media content" refers to the fact that a user may generate, create or select any media content that is appropriate to display. This differs from client voting on or selecting of media content that is displayed by another in a meeting or presentation. This term refers to client oriented, distributed rights and privileges for the display of content rather than a central presenter providing content which is presented to the members of the meeting.

"Unified Communications system or tools" refers to audio or audio visual communications such as provided by "Skype™" or "Skype™ for business". Such software can take over audio and/or visual data provided from a host processing device. Unified communication tool can be described as a collection of tools to do VOIP, (web) conferencing, shared whiteboarding, message exchange (e.g. chat), file transfer, or presence. Unified Communications system or tools can make use of a protocol- or standard defined or specific communication session or interaction, such as Voice-Over-Internet-Protocol ("VoIP), text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™ email, Twitter (e.g., tweeting), Digital Service Protocol (DSP), and the like. Unified Communications system or tools can make use of video conferencing cloud service including a video conferencing node to allow one or more users located at the first video conferencing endpoint to communicate with one or more users located at the second video conferencing endpoint in a video conference.

"Screen scraping" in the sense of the present invention refers to reading the video frame buffers and processing them, rather than just rendering them on a display. Screen scraping for presentations is described in US2002/0196378 to Slobodin et al which is included herein by reference.

"Auto composition" or "auto layout" refers to the automatic nature in which multiple graphics/video sources are rendered on a central display, without user intervention and in a way that a user would intuitively expect it to happen.

"Wireless" and "wireless communication network" can be any network that does not use cable links between nodes, e.g. uses RF, optical or InfraRed for communication purposes, such as IrDA, diffuse infra-red, WLAN, WiMax, WiFi, WiFi Direct, LiFi, ultrasound, ZigBee, or Bluetooth or any other wireless communication network known to the person skilled in the art. Any communications network disclosed below can be and preferably is a wireless network. This enables the sharing or combining of at least a selection of functionalities/endpoints of the secondary peripheral devices, i.e. the one-to-many scenario.

"Computer" generally refers to a processing device, i.e. having a processing engine capable of various types of digital processing, such as rendering graphics images for display. A computer can be in the form of a work station, a personal computer, a laptop, a palm top, a PDA, a smartphone, a tablet etc. Generally, a computer has memory such as volatile RAM. Non-volatile memory such as a hard disc, optical disk or solid state memory can be included in the computer or can be a peripheral device. Currently most computers are electronic, but the term "computer" also includes optics based computing devices.

The term "pre-installed generic driver" is intended to mean a driver which is installed on a processing device such as a computer as a standard driver, e.g. is installed with the installation of the operating system. Such a driver is standard for the operating system and can drive a standard class of peripheral devices coupled to or connected to the processing device. The installation of a specific driver for such a peripheral device is not required. Such a generic driver can be a human interface driver (HID) or a mass storage device driver, which has predetermined software components configured for driving mass storage, a CD-ROM, a keyboard etc. or combinations of these. Such devices can be readable and writable computer peripheral memory devices such as USB memory sticks, flash memories, external hard drives, or more.

"Host device" is a processing device that wants to share using a first peripheral device or dongle.

"Functional device" is a second peripheral device connected in some way to a base unit. The system has the ability to expose second peripheral devices connected to the Base Unit to the first peripheral device transparently as if it were attached to the processing device to which the first peripheral device is connected. The exposure can be implemented with descriptor fields. A functional device can be run with a vendor specific driver alone.

"Endpoints" can be described as data sources or sinks and are defined for USB Devices which can be physical devices or virtual devices. In the present invention endpoints should be interpreted broadly as data sources or sinks. Hence data can be stored at an endpoint or emitted. An endpoint can act as a kind of buffer can be defined for physical devices or virtual devices. The data stored at an endpoint may either be received from or waiting for being sent to the host such as a USB Host. An endpoint is defined by a number of descriptive fields. For example, an endpoint can be configured to support different transfer types such as four transfer types. These transfers can be as defined in the USB specification, e.g. Control Transfers, Interrupt Transfers, Isochronous Transfers, and Bulk Transfers. The skilled person can use these transfer types as required in the present invention. Within the limits of the hardware, endpoints can be configured using middleware, e.g. USB Middleware. An endpoint can be limited to a certain transfer type. A USB Host's client may send data to an Endpoint 1 for example. Coming from the USB Host, the data will be sent to the OUT Endpoint 1. The software running will then read the data as soon as it is ready to do so. Returning data has to be written to the IN Endpoint 1, as the software cannot access the USB bus freely as the USB bus is controlled by the USB Host. The data in IN Endpoint 1 stays there until the host sends an IN packet to Endpoint 1 requesting the data.

A limit can be placed on the number of endpoints. Each endpoint can have one transfer direction. A specific endpoint can be defined, for example, for control transfers only and cannot be assigned to any other function.

Control Transfers can be bi-directional transfers reserved for the host to send and request configuration information to and from a device using a specific IN and OUT Endpoint.

Each Control Transfer can comprise a number of transactions. Control Transfers can have several stages:
1. The SETUP stage carries a Setup packet, defining the request, and specifying how many data should be transferred in the DATA stage.
2. The DATA stage is optional. If present, it always starts with a transaction containing a DATA1 packet. Then, the transaction type alternates between DATA0 and DATA1 until all required data have been transferred.
3. The STATUS stage is a transaction containing a zero-length DATA1 packet. If the DATA stage was IN, then the STATUS stage is OUT, and vice-versa.

Interrupt Transfers have a limited latency to or from a device. In USB, an Interrupt Transfer, or Interrupt Pipe, has a defined polling rate. Typically, Interrupt Transfer data consists of event notifications, characters, or coordinates from a pointing device.

Isochronous Transfers are used for transmitting real-time information such as audio and video data, can be sent at a constant rate. USB isochronous data streams are allocated a dedicated portion of USB bandwidth to ensure that data can be delivered at the desired rate. An Isochronous pipe sends a new data packet in every frame, regardless of the success or failure of the last packet. Isochronous Transfers need not have error detection. Any error in electrical transmission is not corrected.

Bulk Transfers are used for data which are not of the type Control, Interrupt, or Isochronous. Reliable exchange of data is ensured at the hardware level using error detection.

Bulk Transfers take up all the bandwidth that is available after the other transfers have finished. If the bus is very busy, then a Bulk Transfer may be delayed.

"A specific device exposes a peripheral device or other device" means that the specific device configures one or more endpoints with specific descriptor fields.

DETAILED DESCRIPTION OF THE INVENTION

Embodiments of the present invention allow a wireless connection between a user processing device such as a laptop, computer, PDA, smartphone etc. and a base unit of a wireless network. The wireless connection may be made by an integrated wireless transceiver in the user processing device such as the laptop, the computer, the PDA, or the smartphone etc. Alternatively, in some embodiments of the present invention the wireless connection is made via a first peripheral device plugged into, coupled, connected or attached in some way to the user processing device or is provided by other hardware or software.

Embodiments of the present invention allow users, e.g. participants in a meeting room, to make use of at least one functional device, some functional devices or all functional equipment attached to the base unit whereby the at least one functional device has an electronic output such as a digital electronic output and can co-operate with other devices plugged into, coupled, connected or attached in some way to the base unit or is provided by other hardware or software. The at least one functional device can be provided by either plugging in a second peripheral device e.g. a dongle or by a wireless connected second peripheral device or by connecting to the at least one functional device with some software which can be downloaded or pre-installed. The at least one functional device can have an electronic output such as provided by a touch screen, a microphone, a speakerphone, a camera and can function with devices which have an electronic input such as a display or a speaker. Embodiments of the present invention provide the functional device for shared use by participants in a classroom or meeting room.

The at least one functional device coupled or connected or attached to the base unit, e.g. via a serial connection such as a serial plug-and-play connection e.g. USB or via a wireless connection such as a Near Field Communication (NFC) connection, e.g. a Bluetooth connection, an IR connection etc. is made accessible and usable to one or more users in the meeting room or classroom. Preferably this is done in a transparent and standard way. In different cases, the system can behave as a wireless (e.g. USB) hub, in another case, the first peripheral device or other hardware or software exposes a virtual device that has the same functionality or more as the combined functionalities of the functional devices e.g. second peripherals which are coupled or connected or attached to the base unit.

Embodiments of the present invention make use of a base unit, the base unit comprising at least a transmitting function and usually a transmitting and receiving function such as a transceiver function. The base unit is a base unit of a network such as a wireless network and hence can have a transmitter, a receiver or a transceiver. The base unit can be a hardware box comprising a digital processing engine such as an FPGA, a CPU, a GPU etc. as well as memory and input/output ports and which is adapted for connection to e.g. by plugging it in, any functional device such as one or more second peripheral devices that can be used in a meeting room or classroom with or without visual or audio capabilities. Functional devices, such as the one or more second peripheral devices, for use with the base unit can include one, some or all of a television or other video provider e.g. providing images such as video over an HDMI, DVI, USB or other connection, an image capturing device such as a camera, e.g. for providing captured images like video over a USB or HDMI or other connection, audio devices such as speakerphones providing audio such as speech or music over a USB connection or other connection, or speakers over a USB connection, making use for example of a 3.5 mm audio jack, SPDIF or other connection, or one or more microphones making use for example of a 3.5 mm jack, USB or other connection, display devices such as touchscreens making use for example of a USB or other connection, all-in-ones over a USB connection and any other functional device or first peripheral device that can be connected to e.g. plugged into the first device such as the base unit and which have, for example, an electronic output such as a digital electronic output.

Embodiments of the present invention comprise a device such as a first peripheral device comprising at least a receiving function and usually a transmitting and receiving function such as a transceiver function. The first peripheral device (being at least a receiver device) can be hardware e.g. having a wireless or wired connection capability, software or a combination of both that can be connected to the base unit over a wireless connection such as a Wi-Fi, Bluetooth, Wi-Gig, Li-Fi, NFC or similar connection, or a wired link e.g. a USB, Ethernet, etc. connection. This allows the base unit to expose and make available any functional device such as a second peripheral device that is connected to the base unit, to one or more first peripheral devices (e.g. receiver devices) such as to expose and make available simultaneously with a plurality of first peripheral device (e.g. receiver devices) in one of following ways:

1. By exposing the or each functional device (such as the or each second peripheral device) connected to the base unit in a one-on-one manner or in a one to more of the first peripheral devices or user processing devices manner, e.g. to one or more first peripheral devices or user processing devices, preferably without interpretation or processing the electronic signals from each functional device e.g. the second peripheral device e.g. by tunneling the packets from the base unit to the endpoints of the one to more of the first peripheral devices or user processing devices.
2. By interpreting, processing and translating the electronic signal coming from the at least one functional device, e.g. the second peripheral device and, for example mimicking the at least one functional device, e.g. the second peripheral device at the first peripherals' end (e.g. receiver devices' end), either in software or hardware or both. With mimicking is meant that the same device is exposed in the endpoints as the second peripheral device connected with the base unit although the communication is not simply being tunneled as in the first and second methods described above.
3. By combining one or more functional devices, e.g. second peripheral devices or part of a second peripheral device and exposing it to the one or more first peripheral devices, e.g. receiver devices through a custom device in hardware, software or both.
4. By combining one or more functional devices e.g. second peripheral device(s) or part of a second peripheral device and exposing its functionality to the end user through proprietary software.
5. By combining any of the above methods to provide the function of the functional device e.g. the second peripheral device to the one or more first peripheral devices such as receiver devices.

When a functional device, e.g. a second peripheral device is exposed natively or as a mimic of such a device in hardware, use can be made of endpoints such as USB endpoints on the first peripheral device or the user processing device which can expose the corresponding second peripheral devices such as USB devices connected to or plugged into the base unit (as is done in a hub), so no proprietary software or drivers need to be installed to support this.

When exposing custom devices, i.e. specifically developed to work with the present invention use is made of these same endpoints of the first peripheral devices such as the receiver's hardware or it can be done in software with a driver.

A first peripheral device can be used to set up a connection such as a wireless or wired connection between a first peripheral device and base unit, e.g. by acting as a hub such as a wireless hub of which a wireless USB-hub is one example. Whatever second peripheral device is connected to or plug into the base unit e.g. a second peripheral device selected from the non-exhaustive list given above of a TV, video device, audio device, speakerphone, camera, display . . . , is exposed to the first peripheral device in any of the 5 ways described above.

Advantages of embodiments of the present invention can be one, some or all of the following:

In one implementation, all second peripheral devices, which can be USB devices, are mirrored one on one, needing no additional drivers or software to be installed on the users' processing devices other than the second peripheral's vendor's drivers. The second peripheral devices can be exposed to the user's processing device either by the hardware of the first peripheral device directly, or by using a software virtual hub on the first peripheral device or on the user's processing device.

In another implementation, different second peripheral devices (e.g. speakers, microphones, e.g. with electronic outputs and/or inputs) can be combined and connected to the same base unit. Additional functionality such as echo cancellation, translation, encoding/decoding, etc) can be provided in the base unit. Only one second peripheral needs to be exposed through the first peripheral device to the user's processing device.

combination of previous two methods can be provided for one or a combination of devices or functions. Different approaches can be used within one final solution, depending on if the device or function needs to be available to multiple users at once, the technical feasibility of simply minoring of the device etc.

By adding some software to the client software running on the user processing device, configuration for these devices can be made easier (e.g. set as default devices) and some custom controls (mute, pan/tilt/zoom, . . . ) can be added.

Some controls can be added to the first peripheral device ome processing can be done on the base unit to make such controls obsolete (e.g. automatic gain control on an audio signal, framing of participants to remove the need for PTZ)

Multiple users can use the functional devices in contrast to regular hub, with which only one person can plug in only one cable. Each user processing device to which a first peripheral device is plugged in can use these functional devices and the base unit will make sure all streams are correctly captured, played, processed, combined and/or enhanced.

Different streams can be given different priority (speed, throughput, . . . ) to adjust to the unpredictable nature of the wireless communication channel. E.g. to prioritize audio streams over video streams to enhance the call experience.

When having a VOIP call such as a Skype™ call in a meeting, the first peripheral device is connected to, e.g. plugged into a user processing device and all the functional devices connected to the base unit can be used, e.g. a better camera that gives a wide a room view, a better microphone and better speakers). This is especially beneficial when there are multiple people in the room that want to attend the conference call such as a VOIP or Skype™ call.

With reference to FIG. 1 group 90 is a microprocessor or FPGA based device comprising one or more peripheral devices 91-93 which can be connected to, e.g. plugged into a base unit 100. The peripheral devices 91-93 may be connected to the base unit100 by means of standard connections such as serial connection of which Firewire (IEEE-1394), PCI, Mini PCI, PCI Express, Mini PCI Express, PCMCIA, PC Card, Universal Serial Bus (USB), SDIO cards, HDMI, DisplayPort, Bluetooth etc.

Group 90 can be used to expose for example the peripheral devices
  A webcam 91
  A speakerphone 92
  A number of HID endpoints 93

The Base Unit 100 has an electronic digital processor such as a microprocessor or FPGA based device and comprises for example:
  A Web interface 110 which is an interface for the base unit 100 in which one can configure the system
  One or more drivers 111, e.g. two specific drivers for webcam 91 and speakerphone 92 running on the base unit 100 to receive or send data from/to the group 90 and USB peripherals 91-93.
  Additional processing is done in blocks 112, 114, 115 for both audio and webcam encoding, mixing, (de)multiplexing and other processing.
  Data can be encrypted or decrypted in decrypters/encryptors 113, 116 before being sent to the first peripheral device 130 over a wireless link 127.
  The control modules 117 in base unit 100, and 37 in the first peripheral device 130 use a control channel 128 between the base unit 100 and the first peripheral device 130 to perform various functions such as keep alive, identification, crypto key exchange etc.
  Unified protocol block 118 is a functional block abstracting primary functions of the system: screen sharing and other non-media streaming (e.g. mouse pointer)
  Encryption and decryption modules 119, 120 are provided for the main communication with the first peripheral device 130 and other applications.
  An encoder such as H264 encoder 121 provides and local view block 123 (which is a functional device or functional devices as it/they emit a signal from the base unit 100 towards the user processing device 160) are provided to capture the rendered image on the main display 126, encode it and send it back to the first peripheral device 130 and other clients
  Audio processing blocks 124 are provided for audio content.
  Video decoder 125 is provided to decode and render the screen content to the display 126.

First peripheral device 130 is a microprocessor or FPGA based device comprising for example
  Webcam video coming from webcam 91 of base unit 100 is decrypted in block 30 and exposed to processing device 160 through a USB video endpoint via USB video and drivers such as H264 drivers 31.
  Audio signals from speakerphone 92 connected to the base unit 100 are decrypted in block 32, processed and exposed as microphone signal from the USB speakerphone endpoint 92.
  Audio signals from processing device 160 coming through a Speakerphone USB endpoint is encrypted in block 35 and sent to the Base Unit 100 via wireless connection 127.
  Control HID (Human Interface Device) 51 is a minor of additional HID USB endpoints that the Group 90 and the second peripheral devices 91-93 have exposed to the Base Unit 100.
  A vendor specific HID endpoint indicated as datapump 42 is used for a channel 52 which can be a high bandwidth data channel between vendor specific software such as software 70 running on processing device 160 and the Base Unit 100 over the first peripheral device 130. Screen video and audio signals for display 126 can be sent over this channel 52. This is preferred compared with doing this over a control HID endpoint in the first peripheral device 130. Also the screen input of display 126 which is captured (block 123) and encoded (block 121) in the Base Unit 100, is sent to the vendor specific software running on the processing device 160 to allow other users such as a plurality of users or participants in a meeting each of which has got a processing device 160 and optionally a first peripheral device 130 plugged in, to view what is on the display 126 on a display (not shown) on their own processing device 160.
  A number of basic components such as the operating system (OS) and the drivers to control optical indicators such as an LED ring on the first peripheral device 130, bandwidth measurement module and other the wi-fi modules, update/upgrade modules e.g. over wireless, secure boot module, secure key storage, debug and test module, etc. are provided in blocks 45 to 50.
  The audio capture module 43 exposes speakers' endpoint to the processing device 160. The module 43 captures this audio and sends it back to the vendor software 70 running on the processing device 160 where it can be timestamped (block 69) and aligned with the video data and then sent, for example, to the Base Unit 100 through the datapump 42. This allows better timestamping and lipsync.
  In a less preferred embodiment the audio can be captured and processed on the first peripheral device 130 and sent immediately to the Base Unit 100.

A microprocessor or FPGA processing device 160 such as a computer, laptop, smart phone, personal assistant (PDA) etc. runs proprietary software 60, 70 including for example $3^{rd}$ party software (e.g. Skype) 60.

3rd party software 60 is running on processing device 160 (e.g. communications software such as Skype™) which uses the video endpoint from the at least one functional device 91-93 (e.g. the webcam 91 that was attached to the Base Unit 100) and/or the speakerphone endpoints (both speakerphone microphone and speakerphone speakers)

Block 70 comprises software developed and dedicated to the present invention to:

Decrypt (61) and decode (62) a pipeline which will then show the screen data of display 126 from the Base Unit 100 in a window of the software. The data following the arrow 71 going out of the last stage (local view 63) is captured by the communications software such as Skype client software 60.

The unified protocol block 64 is a module that handles the control layer and controls the media paths, the connection to the first peripheral device 130 and (indirectly) the connection to the Base Unit 100.

Pipeline 65-67 is for screen capture (67), encoding (66) and encryption (65) for the screen sharing to the Base Unit 100.

Pipeline 68, 69 receives the speaker's audio signals (block 68) back from the first peripheral device 130, does processing (e.g. timestamping, block 69) and sends it out through the HID endpoint (the "data-pump" 52).

Endpoints not used by the software in this case are the control HID from the second peripheral devices. If some software were running from the vendor of a second peripheral device, this software can communicate with the relevant second peripheral device over these HID endpoints (e.g. camera pan/tilt/zoom).

Speakers endpoint (the content audio arrow 53) is used by the operating system (OS) of the processing device 160 to send all (non-speakerphone) sounds/audio signals.

Connecting a First Peripheral Device to a User Processing Device

A first peripheral device 130 can be connected to a user processing device 160 by a method 300 as indicated in FIG. 2. The connection can be a serial connection such as a USB connection for example, such as USB 1, 2, 3 or –C etc. and the peripheral device 130 is connected to, e.g. plugged into a plug-and-play serial port such as provided for a USB connection. The first peripheral device 130 may include a user input device, e.g. an actuator. The first peripheral device 130 can be configured as a connection unit and can be a physical device in the form of a connector for a plug and play interface of a user processing device. It can have a base and a flexible data and power connection attached to the base. The base can have the actuator, e.g. a button configured to be an input device which can be activated by a user.

The flexible data and power connection should be adapted so that the base lies flat on the meeting table independent of the orientation of the connector needed to insert the connector into the plug and play interface. The base preferably includes electronics and optionally has permanent storage for storing an application such as a portable application. Network configuration parameters for the WiFi connection to the base unit 100 can also be stored in a memory. The first peripheral unit may have a processing engine (e.g. CPU, GPU, FPGA), a wireless transmitter/receiver such as for WiFi or LiFi, a plug and play interface such as a USB interface, a light ring such as an LED ring or strip as visual indicator. The portable application can be stored on the first peripheral device 160, i.e. in the base or it can be downloaded, obtained from on another pluggable device like a flash drive, be downloaded from the base unit 100 etc. The visual indicator is for allowing user feedback from the connection unit of the status of any activity.

Some examples for activation of the actuator which can be used with any of the embodiments of the present invention: Sound activated (hand clap, voice recognition, computer sound, music, . . . ) Remote controlled via wireless connected device (IR, Bluetooth, WiFi, LiFi . . . ), Light activated, Pressure activated, e.g. depression with a finger or hand, Touch activated, Proximity ('near-touch' on the actuator or bringing the actuator close to some object, Biometric reader such as Fingerprint reader, Iris scanner, DNA analyser, Keypad, e.g. for entering Keycode e.g. a password.

The method 300 comprises in step 301 connecting the first peripheral device 130 to a processing device 160, e.g. by plugging in. This results in a kernel boot step 302 and exchange of initialization scripts in step 303. The first peripheral device 130 is discovered to be a USB device in step 306 and the USB protocol stack is loaded in step 304 followed by loading the wireless connection protocol stack in step 305. The parameters for the wireless connection are input e.g. from a memory on the first peripheral device 130 or by the user and the wireless connection association completed in step 307. Any client software that needs to be loaded onto the processing device 160 is now loaded and launched in step 308, e.g. by user action. The first peripheral device 130 is now ready in step 310 to share data with a display screen 126 attached to the base unit 100.

Figure 3:
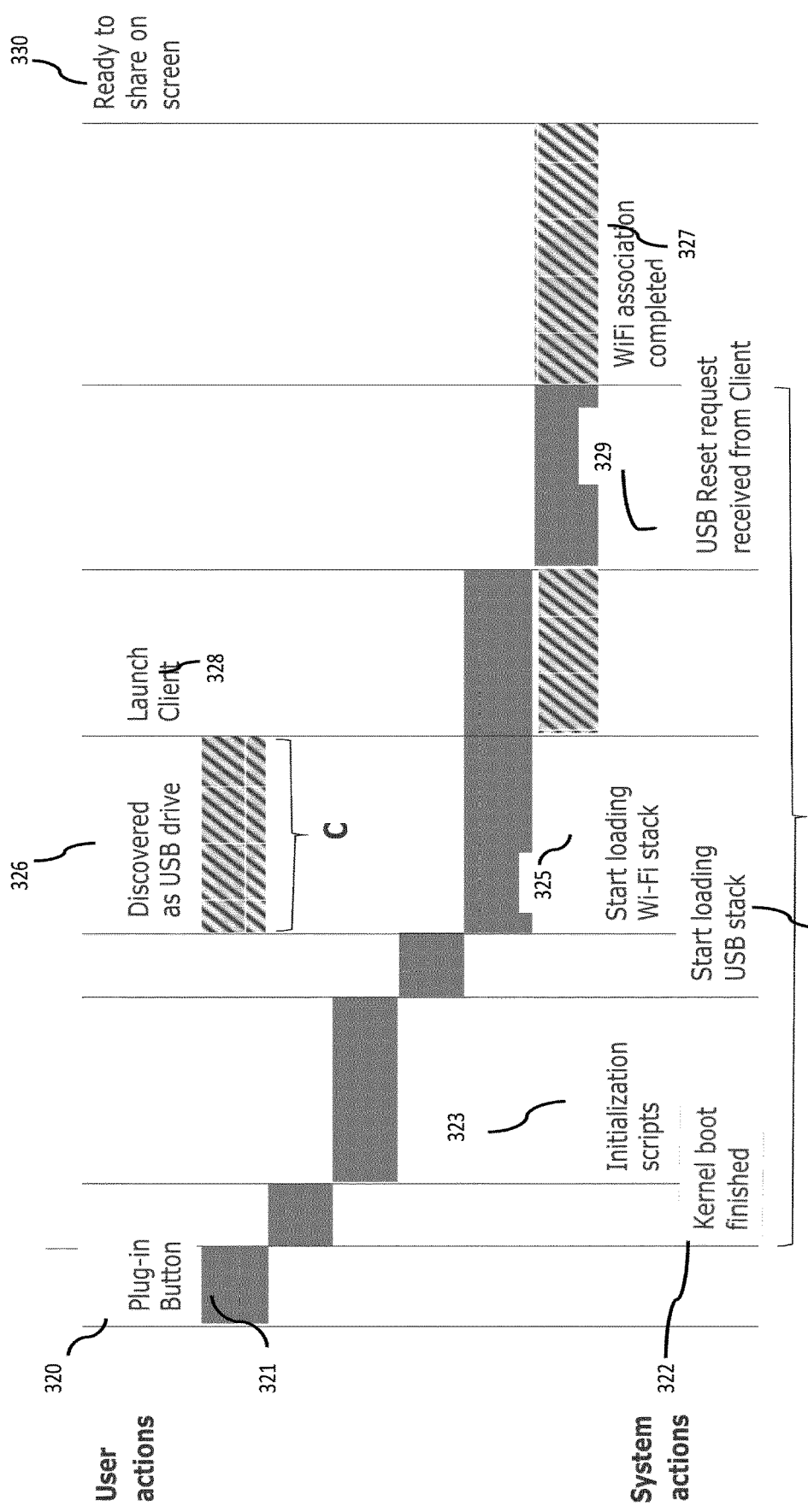

As show in FIG. 3 if a launcher program is available e.g. stored on the first peripheral device 130 or stored on the processing device 160, or retrievable from a remote location such as a URL on the Internet, or form a LAN server, this can launch the client software in step 328 automatically. Steps 321 to 327 and 329 and 330 are the same as steps 301 to 307 and 309 and 310 of FIG. 2.

For example, the client software can be the software 70 of FIG. 1 running on processing device 160. Other software such as communications software 60 e.g. Skype™ can be pre-installed on processing device 160. Client software 70 can be for the processing of video data from the processing device 160, and this client software is executed on the processing device 160 e.g. using a processing engine such as a CPU, GPU or FPGA. The client software 60 can be screen scraping software that screen scrapes the screen of the processing device 160. This client software 60 can be stored as a software program in memory such as mass storage on the first peripheral device 130. This software program is executed such as loaded onto the processing device 160 when it is coupled thereto, either automatically or by user action as described above. When the software 60 is running on the processing device 160 it is preferred that it leaves zero footprint on termination. The software 60 when executed on the processing device 160 captures the video data that is available on the processing device 160, e.g. from a presentation or video that is running on the processing device 160. For example, the software 70 when executed on the processing device 160, is adapted to screen scrape, e.g. to read one or more video frame buffers from a graphics card in the processing device 160. Generally, the processing device 160 will have its own display and hence will have a graphics card or something equivalent with a buffer for storing video data. This read video information can be time stamped (in block 69) with a clock time, to be able to later synchronize the captured video signal with a related audio signal. The video signal is then encoded in a video encoder (block 66), for transport (arrow 53) over the plug and play interface using a generic driver, such as over a USB interface using generic pre-installed drivers, e.g. a generic pre-installed Human Interface Driver (HID). The data is transmitted to the wireless communications network 127 such as a WiFi or LiFi network and routed over the communications network 127 to the base unit 100, inserted into a suitable composition such as an OpenGL based composition in a compositor for display on the display device 126.

Sending Data from the Processing Device to the Base Unit

Figure 4:
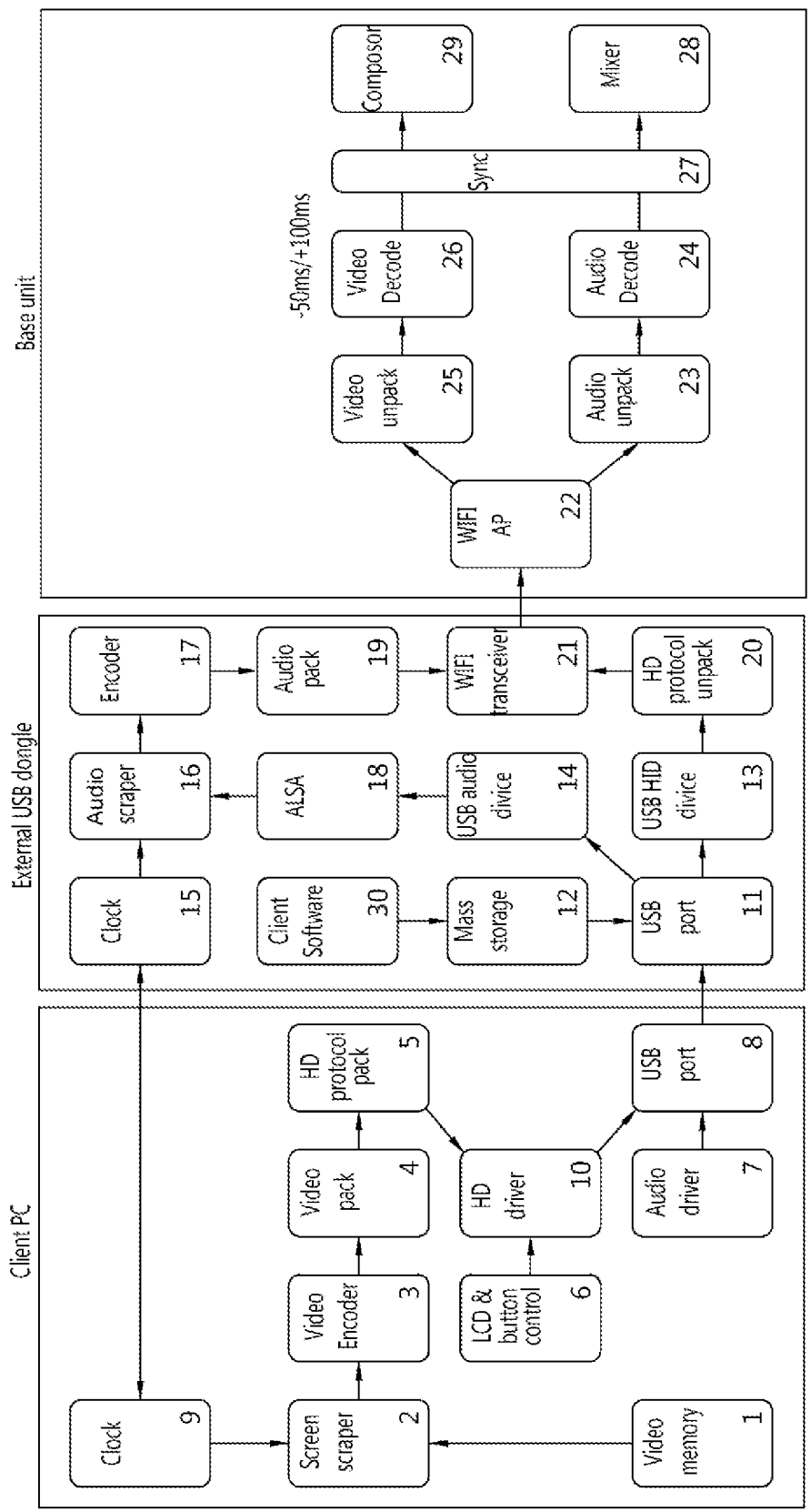
FIG. 4 shows an arrangement of components that can be used in embodiments of the present invention. This figure is FIG. 11 of WO 2013/037980 entitled "Electronic tools and methods with audio for meetings" which is incorporated herein by reference with respect to FIG. 11 thereof and also in its entirety.
Figure 5:
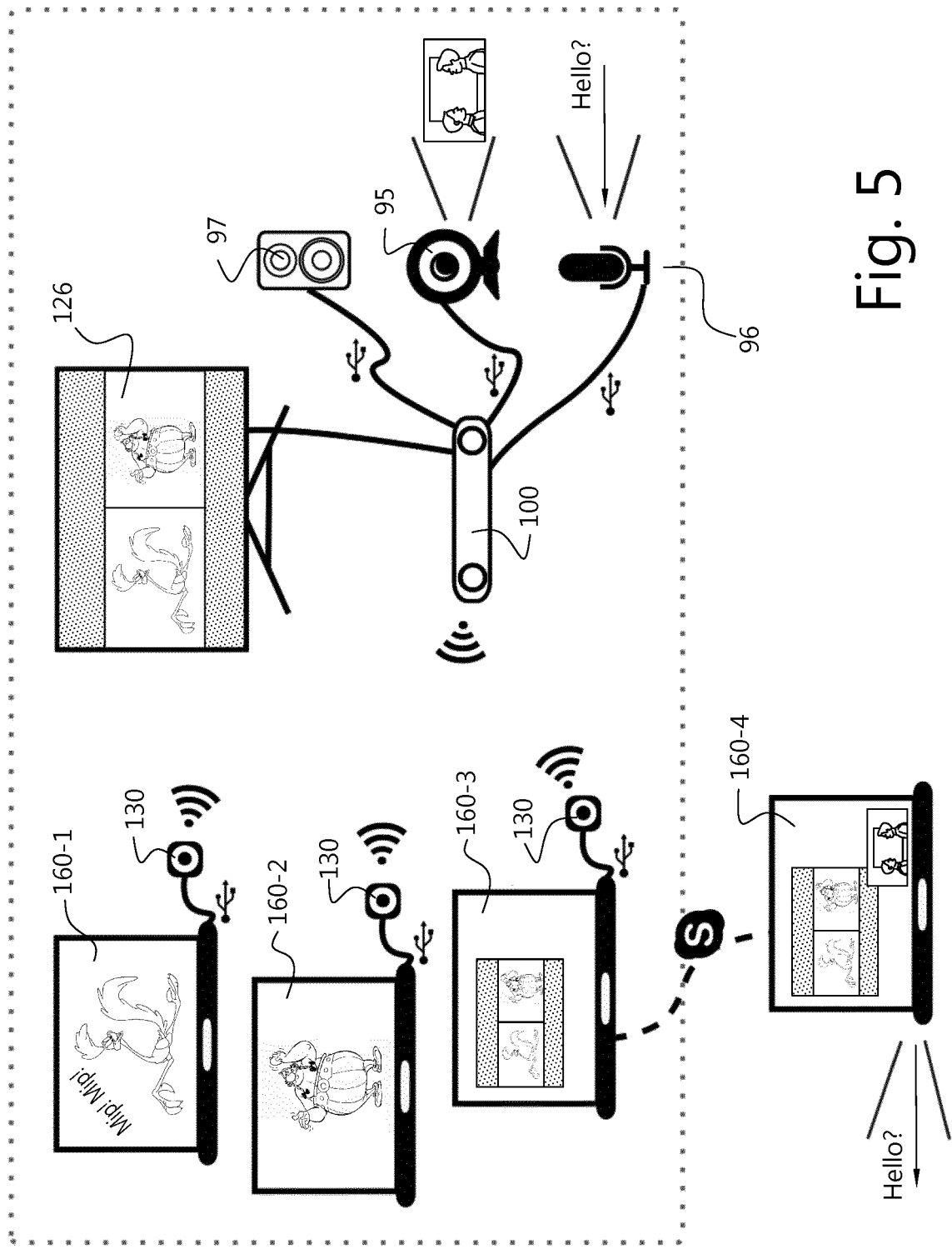
FIG. 5 shows an arrangement of processing devices as used in a meeting with a unified communication in progress according to an embodiment of the present invention.

With reference to FIG. 4 the audio data on the processing device 160 such as a computer, laptop, smartphone, PDA, tablet, etc, the audio is sent over a port using generic drivers such as over a USB port 8 using the standard built-in generic audio driver such as UAC driver 7. On the first peripheral device 130, the audio packets are read from the generic port, e.g. USB port 11 by a dedicated audio device 14. These packets are then processed by any of a mixer a rate converter, an echo canceller, noise canceller or similar. Any of the mixing, rate conversion, echo cancelling, noise cancelling can be executed using an ALSA driver 18. The ALSA driver offers the packets to a dummy audio device 16 such as an audio scraper. In this audio device 16 the audio packets can be time stamped from the clock 15 that can be synchronized with clock 9 of the processing device 31. This information is then encoded in an encoder 17 and packetized in a packetizer 19 before being transferred to the communications network between the first peripheral device 130 and the base unit 100. The network can be a wireless network such as a WiFi or LiFi network. For this purpose, a suitable transmitter 21 is provided in the first peripheral device 130. On the base unit 100 the audio information stream is recovered at a suitable communications interface such as the WiFi access point 22. The audio is then unpacked in an unpacker 23, decoded in a decoder 24 before being before being offered to an audio mixer 28. In order to synchronise the audio and video streams these are both sent to a synchronizer 27 in which the two streams are synchronized and thus keep lip synchronization.

Sending Data from the Processing Device to the Base Unit

Embodiments of the present invention can capture data such as visual or audio signals and bring these to one or more processing devices 160 so that this captured data can be shared with other participants. These visual or audio signals are captured from, provided by, obtained from functional devices such as a webcam 91 a speakerphone 92, but also captured from display 126. For example, a functional device could be a microphone which located at an appropriate position in a meeting to give good reception of audio data. This can be used with a central speaker system which can be of higher quality than is provided in the processing devices 160 of meeting participants. Such a speaker system could be a quadrophonic surround speaker system for example. This can also avoid the difficulties with multiple microphones and speakers which can result in annoying positive feedback.

Embodiments of the present invention can include the features discussed with respect to FIGS. 1 to 4 to provide additional functionality which can be shared, for example, by all participants of a meeting who have a processing device 160 optionally with a plug-in first peripheral device 130. In embodiments of the present invention, fixed USB endpoints on the first peripheral device 130 are provided for the basic functionality. These are fixed and are a combination of vendor specific endpoints and a number of standard endpoints and can be interpreted or understood as a custom Driver, a default OS driver and/or a host application as has been described with reference to FIG. 4 do screen sharing and audio.

The configurable USB endpoints are configured either when pairing a first peripheral device 130 device with a base unit 100 or over the wireless connection 127 between the processing device 160 and the base unit 100. Once configured, the USB endpoints will expose second peripherals devices 91-93 which can be interpreted as custom drivers, vendor specific drivers or default OS drivers. These can be used by either a host application or third party applications. These endpoints can be an exact copy of the ones of the second peripheral device 91-93 connected to the Base Unit 100 or can be dedicated specified endpoints.

Communication of these USB endpoints with the processing device 160 can be done through standard enumeration of the USB endpoints when connecting, such as plugging in, the first peripheral device 130 to the processing device 160. All information on how to communicate with the Base Unit 100 and which endpoints to expose can be stored on the first peripheral device 130 and can be set up by firmware of the first peripheral device 130.

The decision of which endpoints the first peripheral device 130 should expose can be determined by the Base Unit 100, which can be adapted to analyze which second peripheral devices are connected to the Base Unit 100 (which connection can be through a USB connection or other) and create a configuration for the relevant USB endpoint on the first peripheral device 130.

As indicated above, for embodiments of the present invention, during operations, data can flow in both directions, i.e. to or from the processing device 160:

1. Data from a second peripheral device connected to the Base Unit 100 can flow into the Base Unit 100 or can be captured in the base unit 100 such as data for display 126. Any such data can be interpreted and possibly processed, enhanced, encoded and/or encrypted using firmware of the base unit 100 to generate processed data. In some embodiments this processed data will then be sent to the first peripheral device 130 through a wireless link 127. This first peripheral device 130 will, if necessary, decode, decrypt, process and/or interpret the data and make it available through one or more of the USB endpoints of this first peripheral device 130 (e.g. either the fixed or the configured ones). This data will then be captured by the operating system of the processing device 160 and will be made available through a custom or standard driver to either the host application or a $3^{rd}$ party application running on the processing device 160 or to other processing devices 160 of other participants of the meeting 2. Data, which might be coming from the host application and/or one or more $3^{rd}$ party applications running on the processing device 160 can be sent through a handle which is made available by the system. The data will then be sent to the appropriate USB endpoint of the first peripheral device 130 through the system (standard generic) drivers and the USB port. The first peripheral device 130 will then receive this data via firmware of the first peripheral device 130, where it will process, enhance, encode and/or encrypt the data and send it through the wireless link 127 to the Base Unit 100. The Base Unit 100 will receive the data via firmware on the base unit 100, will decrypt, process, decode and/or enhance the data and forward it to the appropriate first peripheral device, which can be connected or attached to the Base Unit 100 through a serial connection such as USB, HDMI or other interface.

Figure 6:
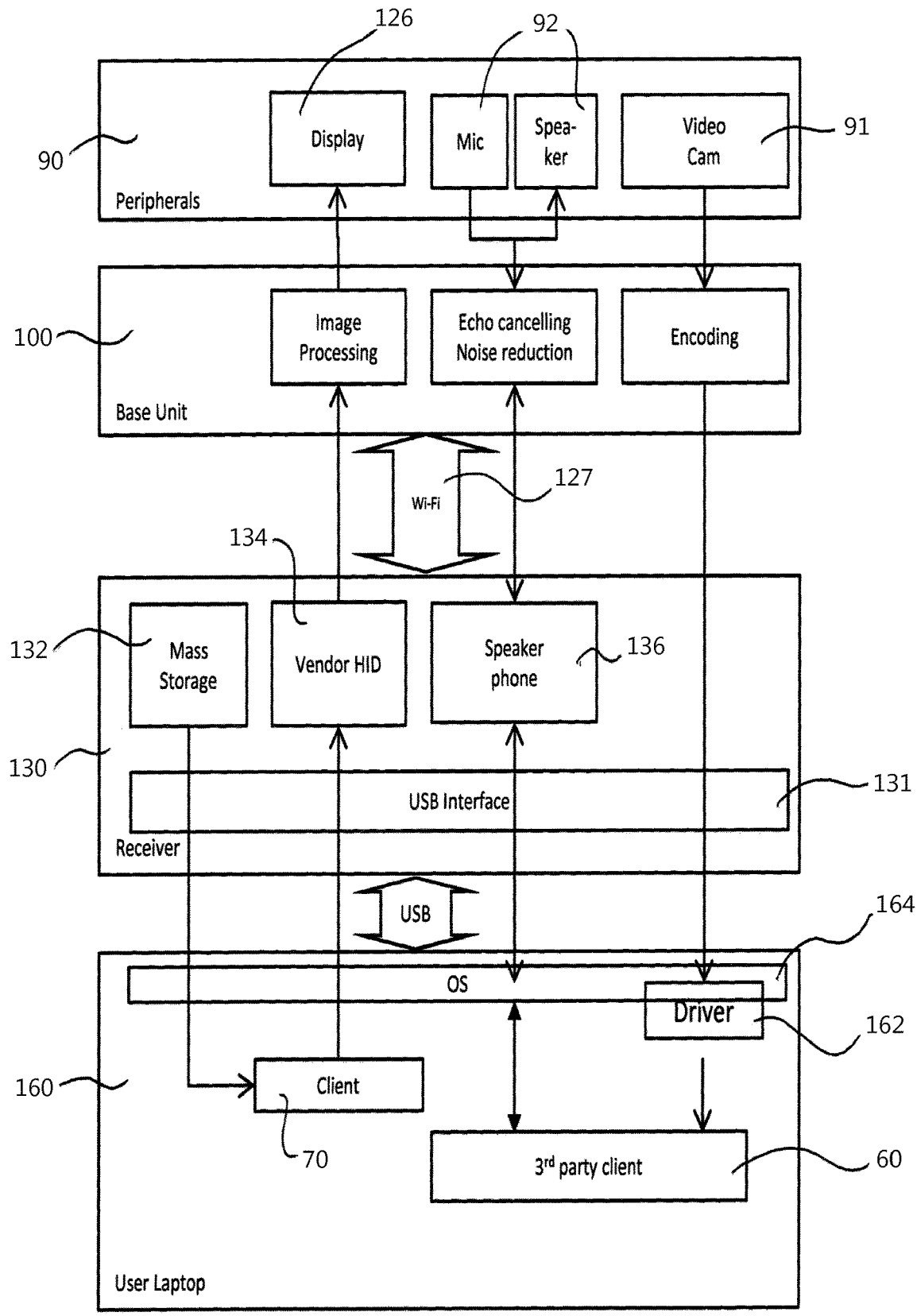
FIGS. 6 to 11 show embodiments of the present invention where a peripheral device is coupled to a processing device.

Such a meeting of multiple participants is shown schematically in FIG. 6 with four processing devices 160 (160-1, 160-2, 160-3, 160-4) which can be laptops. Three of the processing devices (160-1, 160-2, 160-3) each are connected to a first peripheral device 130, e.g. by inserting in a USB connection. One processing device 160-4 can be the host of a Unified Communication (UC) call such as a Skype call or a Skype for Business call. The first peripheral devices of two of the processing devices (160-1, 160-2) have completed connection to a WiFi connection with a base unit 100 and are sharing media to the main screen 126. The processing devices 160-3 and 160-4 are sharing the Unified Communication (UC) call such as the Skype call or a Skype for Business call.

Connected to the Base Unit 100 is or are any of the following:

Webcam 91

A 4K touch screen 94

A camera 95, connected through USB or HDMI

A USB speakerphone 92

USB microphone 96 and a speaker set 97 (connected through an audio jack, s/pdif, USB, HDMI, etc.)

The host processing device 160-4 has pre-installed UC client software. This software interacts with USB endpoints on the first peripheral device 130 connected to e.g. plugged into the host. This type of client software will use speakerphone USB endpoints as a default audio device (e.g. microphone plus speaker). Embodiments of the present invention are in control of all audio or visual signals emitted from and injected in the processing device 160.

The speakerphone 92 can be used by any of the users at least with a first peripheral device 130 connected and functioning. There is no need to perform an action to get access to this device. Separate controls can be made available on a first peripheral device for example to control the volume of the audio output of the Base Unit 100 and to mute the room microphone 96 if necessary. When muted, the microphone 96 is also muted for all other Buttons or apps using this device.

The UC client software 60 running on the host processing device 160-4 does not inject the audio content. The microphone 96 can pick up this signal, or the Base Unit 100 can inject it in the microphone signal to the first peripheral device 130 connected to the host 160-4. There is no need for lip-sync with the content video (even if sharing) as the latency is low.

The same type of second peripheral device is exposed to a user as is plugged in into the Base Unit 100 so that the user can use the drivers provided by the vendor.

If one of the processing devices 130 is sharing in the room, the content audio is shared in the room too.

A processing device with functioning first peripheral device can access the room camera 96 wirelessly. All other devices connected to the Base Unit 100 (e.g. HID control devices 93) will be exposed natively.

Any user connected to the system e.g. through a first peripheral device has the ability to view the content that is projected in the meeting room on a display of the user's processing device, i.e. "local view". The receiver of the local view can have, but is not limited to, one some or all of the following functionality:

The ability to open a window and view the meeting room content in that window independently of whether it is the stream itself, the annotation or a blackboard session.

The ability to zoom into the content.

Additional measures to assure the picture quality when zooming in can be added to the feature The local view could allow the user to start and/or participate in a blackboard or annotation session from his/her own device The ability to take screenshots and/or pause the local view.

FIGS. 6 to 15 and 17 show ways of making various functions available to participants in a room, e.g. a meeting. There are four basic methods each of which is an embodiment of the present invention:

a) to use a generic driver of the OS 164 of the host processing device 160 and endpoints like mass storage or HID endpoints to allow transfer of data using client software running on the host processing device 160 without the host processing device 160 being aware that the final device is a functional device like a camera, touchscreen, microphone, loudspeaker, speakerphone etc. which is connected in or with the base unit 100.

b) to have an endpoint on the first peripheral device of a functional device connected with or in the base unit 100 which means that the host processing device 160 detects that it is connected to the functional device and interacts with it as if it were such a device.

c) to have an endpoint on the first peripheral device of a functional device connected with or in the base unit 100 which means that the host processing device 160 detects that it is connected to the functional device but client software needs to have the vendor specific drivers to be able to interact with the functional device.

d) to have an endpoint on the first peripheral device of a functional device connected with or in the base unit 100 which means that the host processing device 160 detects that it is connected to the functional device but pre-processing is made on the base unit 100 so that the processing device 160 can interact with the functional device. One method is to make a common endpoint on the first peripheral device so that the processing device can work with any functional device for which preprocessing exists in the base unit 100.

FIG. 6 shows the processing device 160 in communication with a first peripheral device 130 connected thereto, base unit 100 in wireless communication 127 with the first peripheral device 130. Various functional devices such as a display 126, a speakerphone 92 (or microphone and speaker set 96, 97) and a videocam 91 (or other camera 95) are connected to the base unit 100.

A generic driver allows the client software 70 to transfer data to and receive data from a mass storage device 132 on the first peripheral device 130 via a USB interface 131. The client software 70 also has a USB endpoint 134 which can be a USB HID endpoint and if necessary, a vendor specific endpoint. This endpoint 134 is the endpoint for the client software 70 for transmitting the data for the display 126 to the base unit 100 where the data can be image processed (blocks 124, 125 of FIG. 1) before being transmitted to the group 90 e.g. via an HDMI connection or similar. Thus, the HID endpoint 134 makes the HDMI display 126 and its audiovisual signals available to any processing device 160 with a first peripheral device attached thereto, when in a meeting room. However, the display 126 is not exposed on the processing device 160, i.e. it is not presented as a display but as an HID endpoint. The videocam 91 can be exposed on the first peripheral device 130 as an endpoint (in a way as described for FIG. 1), the video data being encoded e.g. in block 122 of FIG. 1. Alternatively, as shown in FIG. 6, the video data is encoded in the base unit 100 and is sent via the first peripheral device 130 to a driver 162 of the operating system 164 of the processing device 160 which exposes the encoded data from the videocam 91 on the processing device 160 and makes the video data available to the UC call, e.g. Skype™.

Data from the speakerphone 92 can be processed on the base unit 100 and/or on the first peripheral device 130 and can be mimicked to the processing device 160. The microphone of the speakerphone 92 generates a signal that is transmitted to the processing device 160 via a USB speakerphone endpoint 136 on the first peripheral device whereby any noise reduction or echo cancellation can be carried out in the base unit 100 as described with respect to FIG. 1 (block 115). The microphone data is made available to the UC call as the speakerphone endpoint 136 is recognized by the processing device 160 as a speakerphone as if the speakerphone were plugged into the processing device 160. Also, the microphone data is made available to all other users who have a processing device 160 with a connected first peripheral device. In this embodiment the speaker of the speakerphone has its USB endpoint 136 on the first peripheral device 130.

Figure 7:
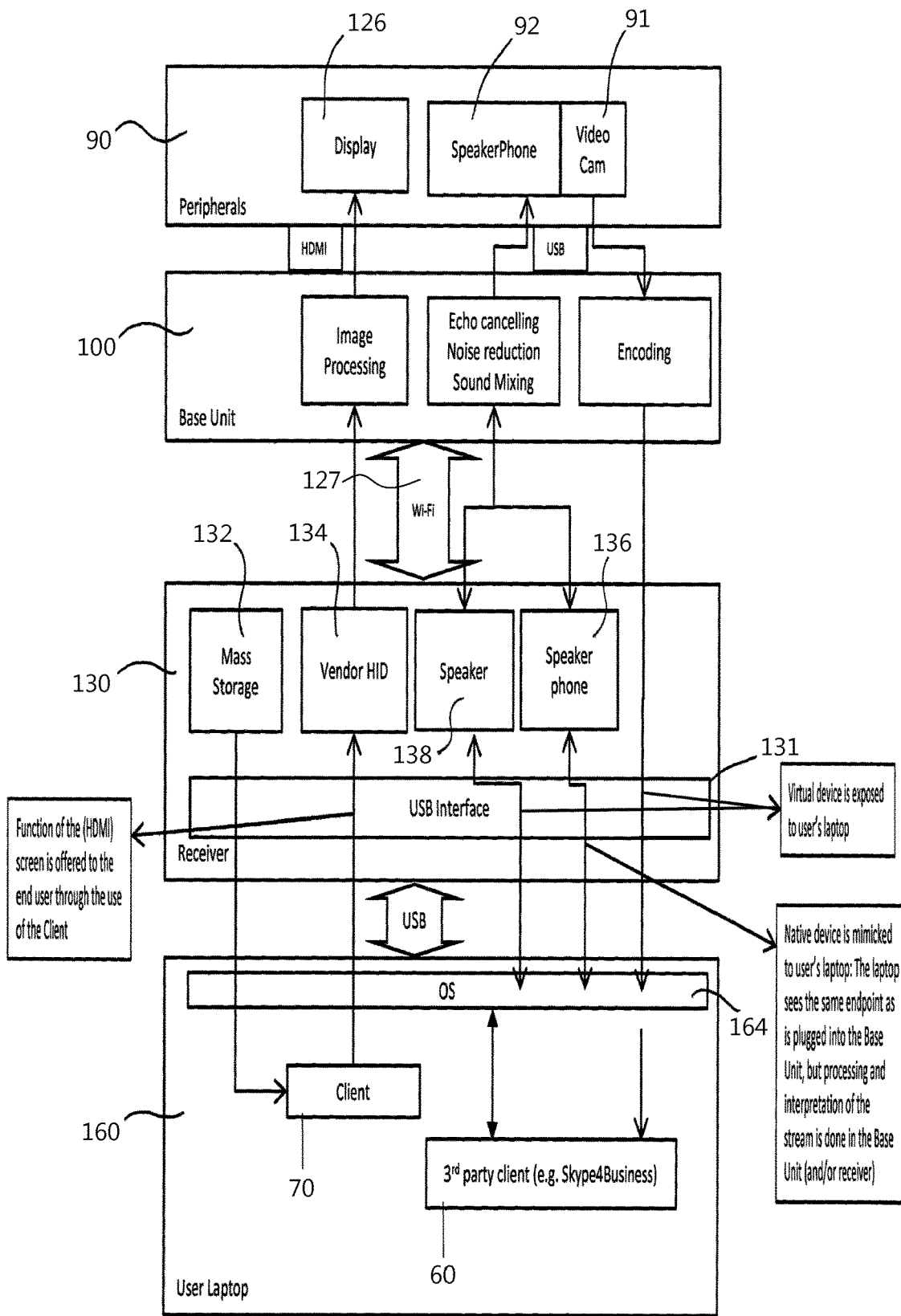

FIG. 7 shows a similar configuration to that of FIG. 6 except there are two USB endpoints 136 and 138 for a speakerphone and a speaker respectively. As previously, the HID endpoint 134 makes the HDMI display 126 available to any processing device 160 with a first peripheral device 130 attached thereto when in a meeting room for providing audiovisual signals to the display 126. However, the display 126 is not exposed on the processing device 160, i.e. it is not presented as a display but as a HID endpoint.

The two endpoints 136, 138 receive audio signals from two different sources. The sound from the UC call can be dealt with as described for FIG. 6 via the speakerphone endpoint 136 and processed on the base unit. But if there is additional audio data which is not part of the UC call, this data is sent via the speaker endpoint 138. As there is no second peripheral device in the group 90 which is a stand-alone speaker, the base unit 100 mixes the audio signals for the speakerphone and the speaker before sending all audio data to the speaker of the speakerphone 92. If there were a separate speaker 97 in group 90, then the base unit 100 could send this audio data to the speaker. The result is that a virtual speaker has been exposed on the processing device 160.

FIGS. 8 to 11 and 17 describe various embodiments of the present invention with the example of how a touchscreen 99 is made available in a meeting room. When a touchscreen is touched it generates a signal related to the co-ordinates of the touch position. This needs to be conveyed to processing devices 160 in a meeting whereby the actual signals must be interpreted if they are to be applied to a different screen on the processing device 160. If there is a meeting with a variety of processing devices being used by participants, then a method needs to be found of presenting the touch co-ordinates to all the different processing devices. FIGS. 8 to 11 disclose the four basic methods mentioned above.

Figure 8:
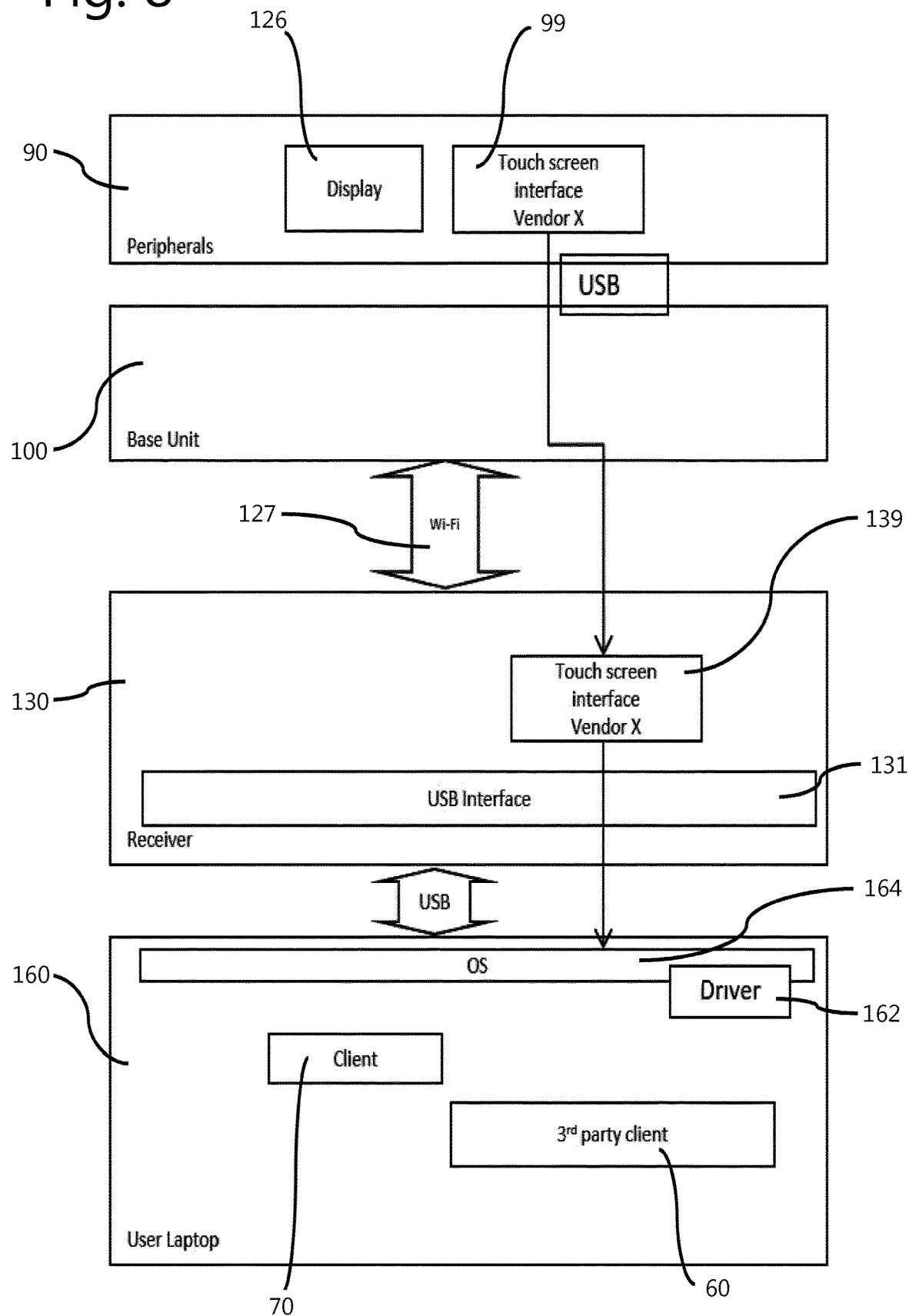

In the embodiment of FIG. 8, there is a group 90, base unit 100, first peripheral device 130 and processing device 160. There are two functional devices connected to or in the base unit 100, namely a display 126 and a touchscreen 99. The touch screen 99 has a touchscreen endpoint 139 in the first peripheral device 130. The processing device 160 recognises this endpoint and can interact with it if the OS 164 has the relevant driver 162. This driver can be downloaded if required. This embodiment requires that each processing device 160 in a meeting downloads or has installed the relevant driver 162.

Figure 9:
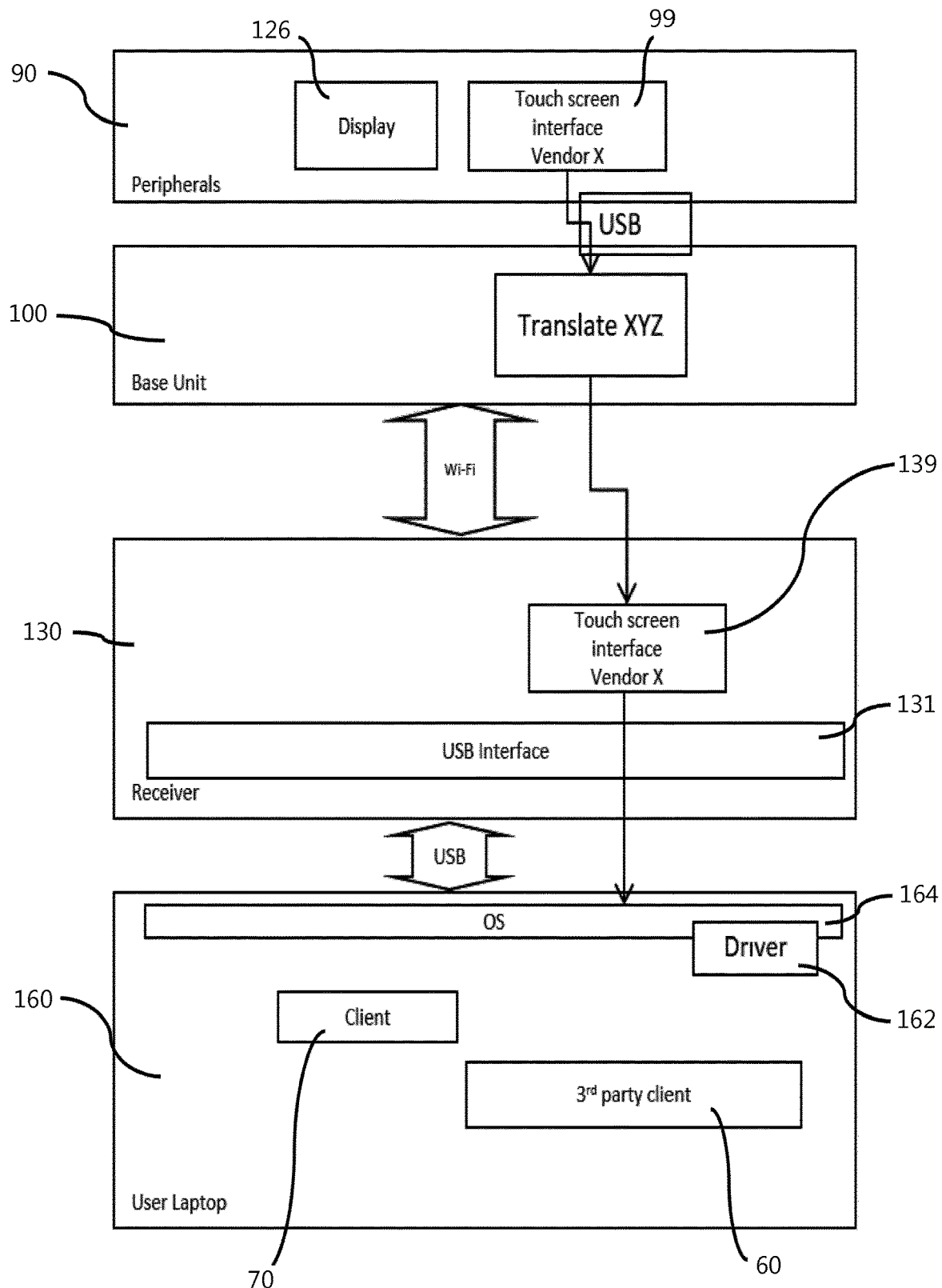

In the embodiment of FIG. 9, there is a group 90, base unit 100, first peripheral device 130 and processing device 160. There are two functional devices connected to or in the base unit 100, namely a display 126 and a touchscreen 99. The touch screen 99 has a touchscreen endpoint 139 in the first peripheral device 130. The processing device 160 recognises this endpoint and can interact with it if the base unit 100 is adapted to translate the co-ordinates of the touch to ones that can be used by the processing device 160, i.e. the OS 164 has the relevant driver 162. This driver can be downloaded if required. This embodiment requires that each processing device 160 in a meeting downloads or has installed the relevant driver 162 but the translation function of the base unit 100 can reduce the number of different drivers that might be required.

Figure 10:
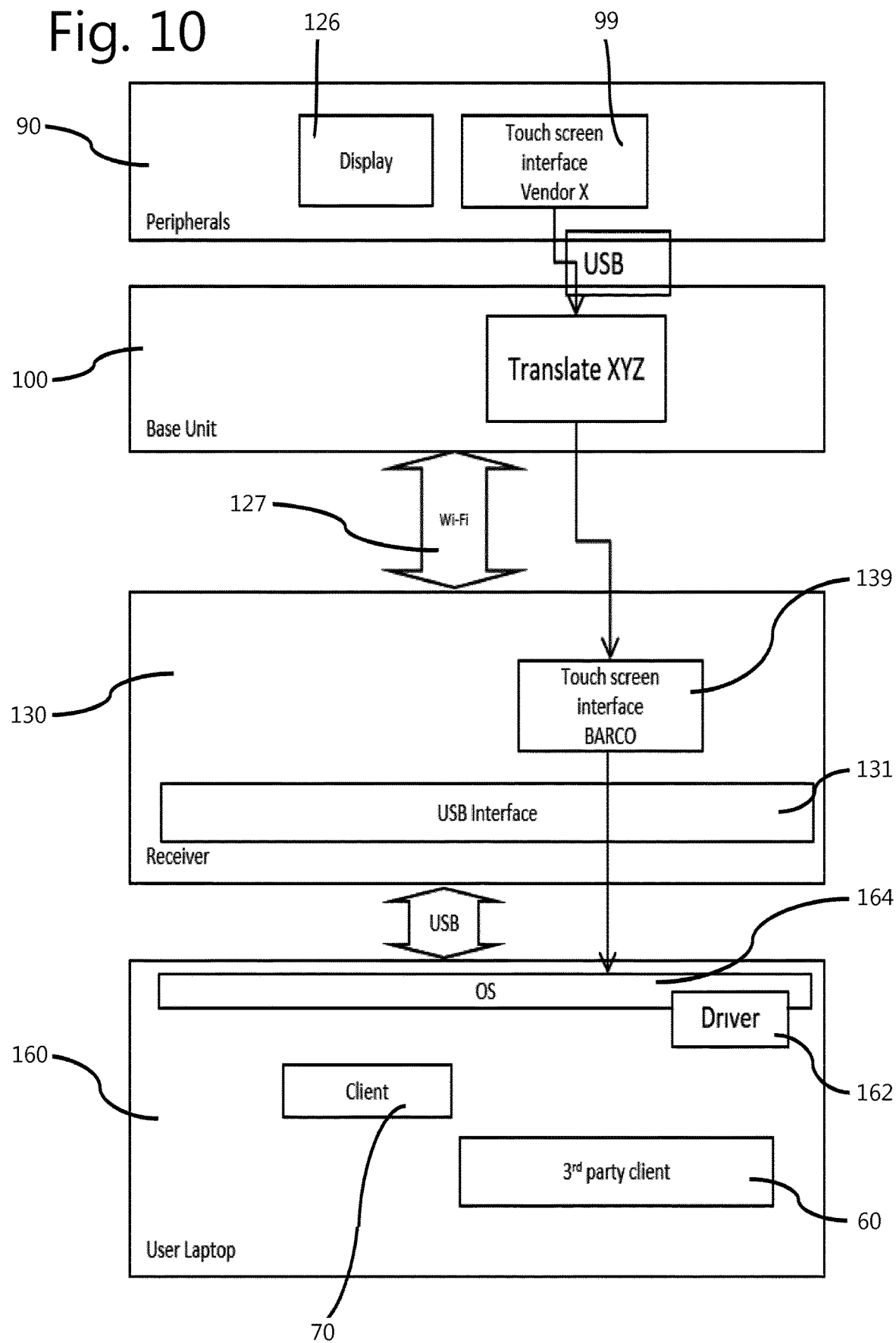

In the embodiment of FIG. 10, there is a group 90, base unit 100, first peripheral device 130 and processing device 160. There are two functional devices connected to or in the base unit 100, namely a display 126 and a touchscreen 99. The touch screen 99 has a touchscreen endpoint 139 in the first peripheral device 130. The processing device 160 recognises this endpoint and can interact with it if the base unit 100 is adapted to translate the co-ordinates of the touch to ones that can be used by the processing device 160, i.e. the OS 164 has the relevant driver 162. This driver is a standard driver which can be distributed, e.g. this driver can be downloaded if required. This embodiment requires that each processing device 160 in a meeting downloads or has installed the relevant driver 162 but the translation function of the base unit 100 can reduce the number of different drivers that might be required even more than with the previous embodiment of FIG. 9.

Figure 11:
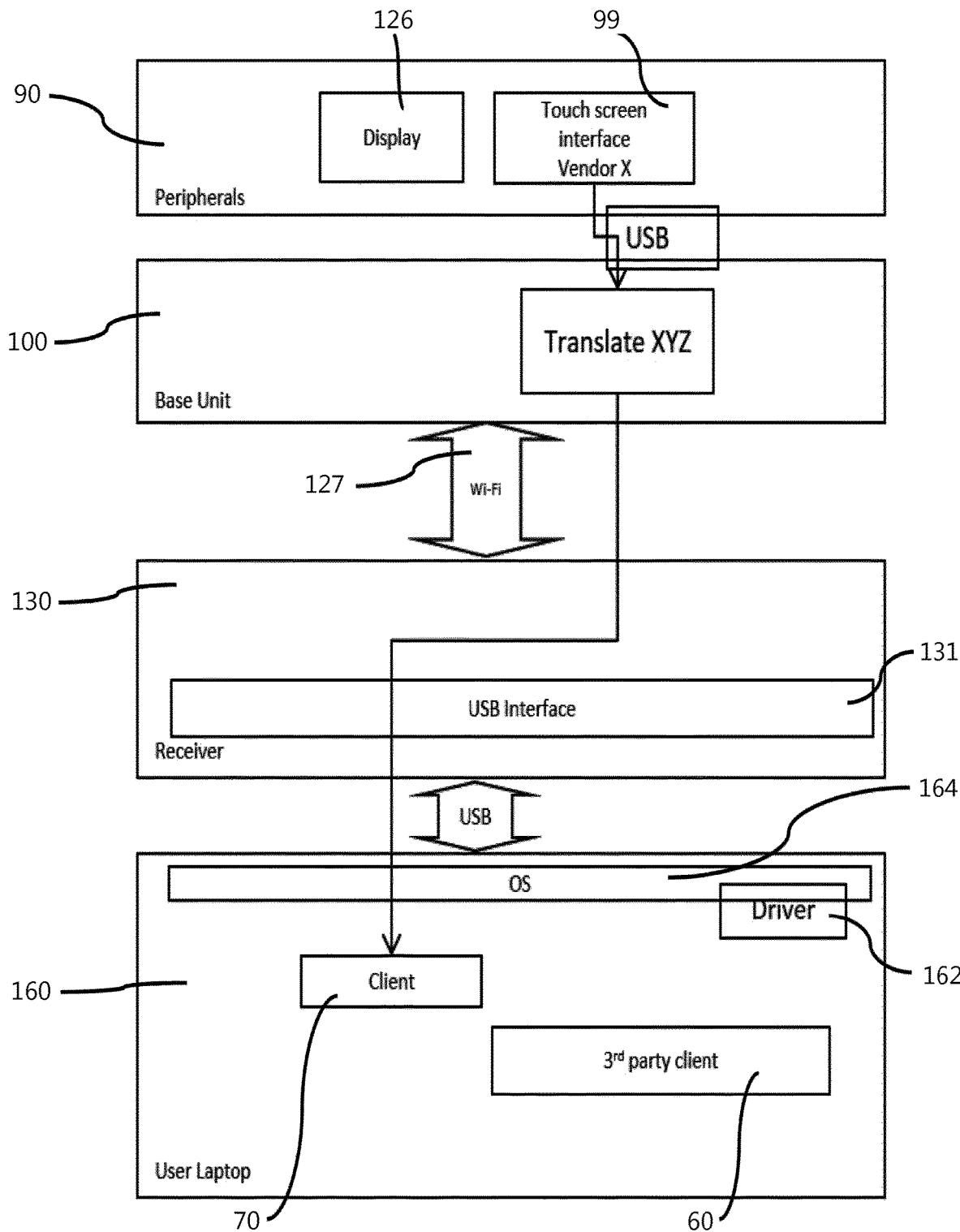

In the embodiment of FIG. 11, there is a group 90, base unit 100, first peripheral device 130 and processing device 160. There are two functional devices connected to or in the base unit 100, namely a display 126 and a touchscreen 99. The touch screen 99 is now dealt with by the client software 70 as has been described previously, namely that the client software running on the first peripheral device 130 is adapted to interact with the touchscreen 99 through the USB interface 131 and to interact with the OS164 of the processing device 160. This means that the touchscreen 99 is not exposed to the processing device 160. The client software 70 is adapted to simulate a touch event and to provide the correct co-ordinates to the OS164 of the processing device 160. This is therefore a proprietary solution which requires the client software 70 to be adapted to interact with each type of touchscreen 99 through a USB interface 131.

Figure 12:
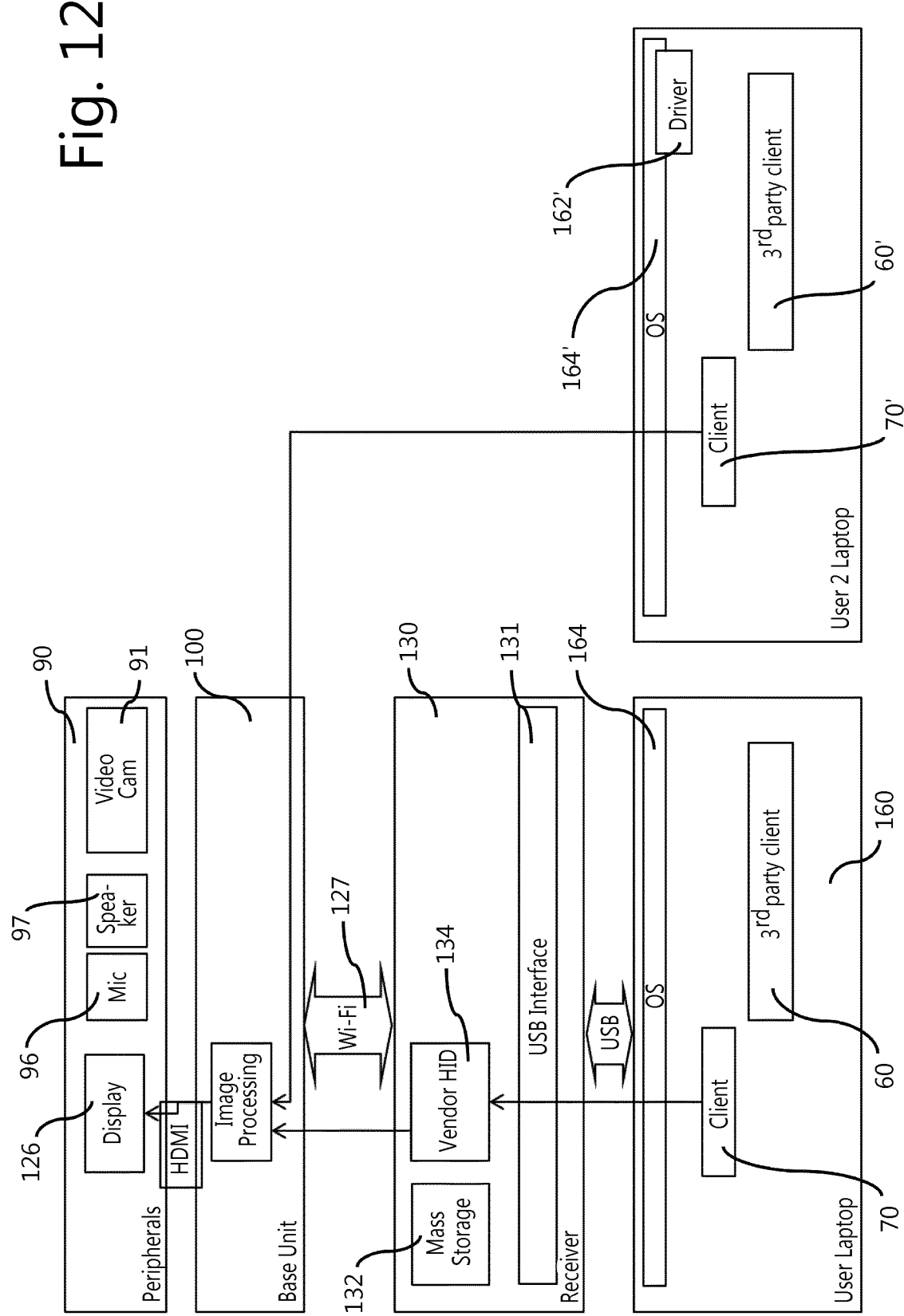
FIGS. 12 to 14 show embodiments of the present invention where a peripheral device is not coupled to a processing device.
Figure 13:
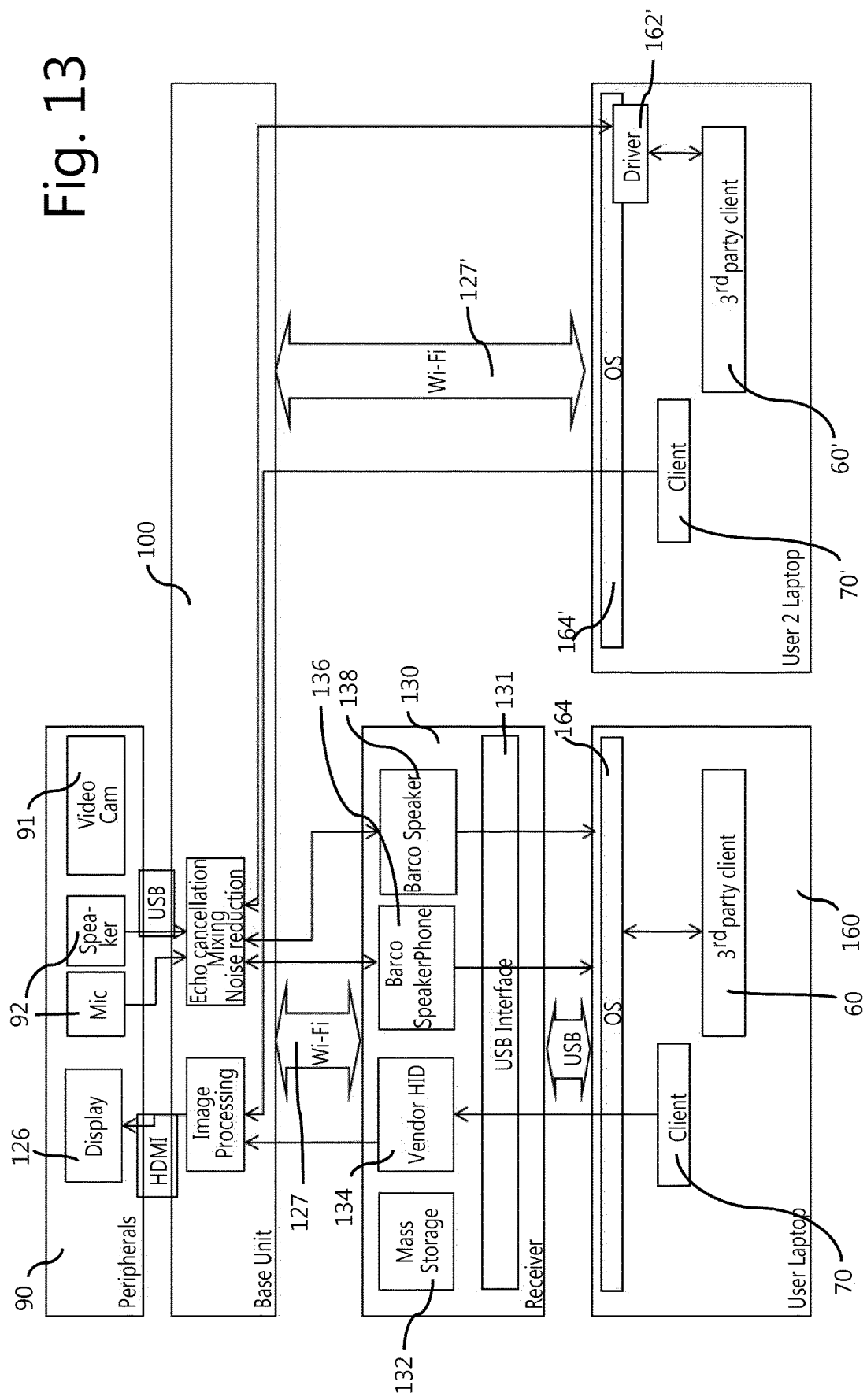
Figure 14:
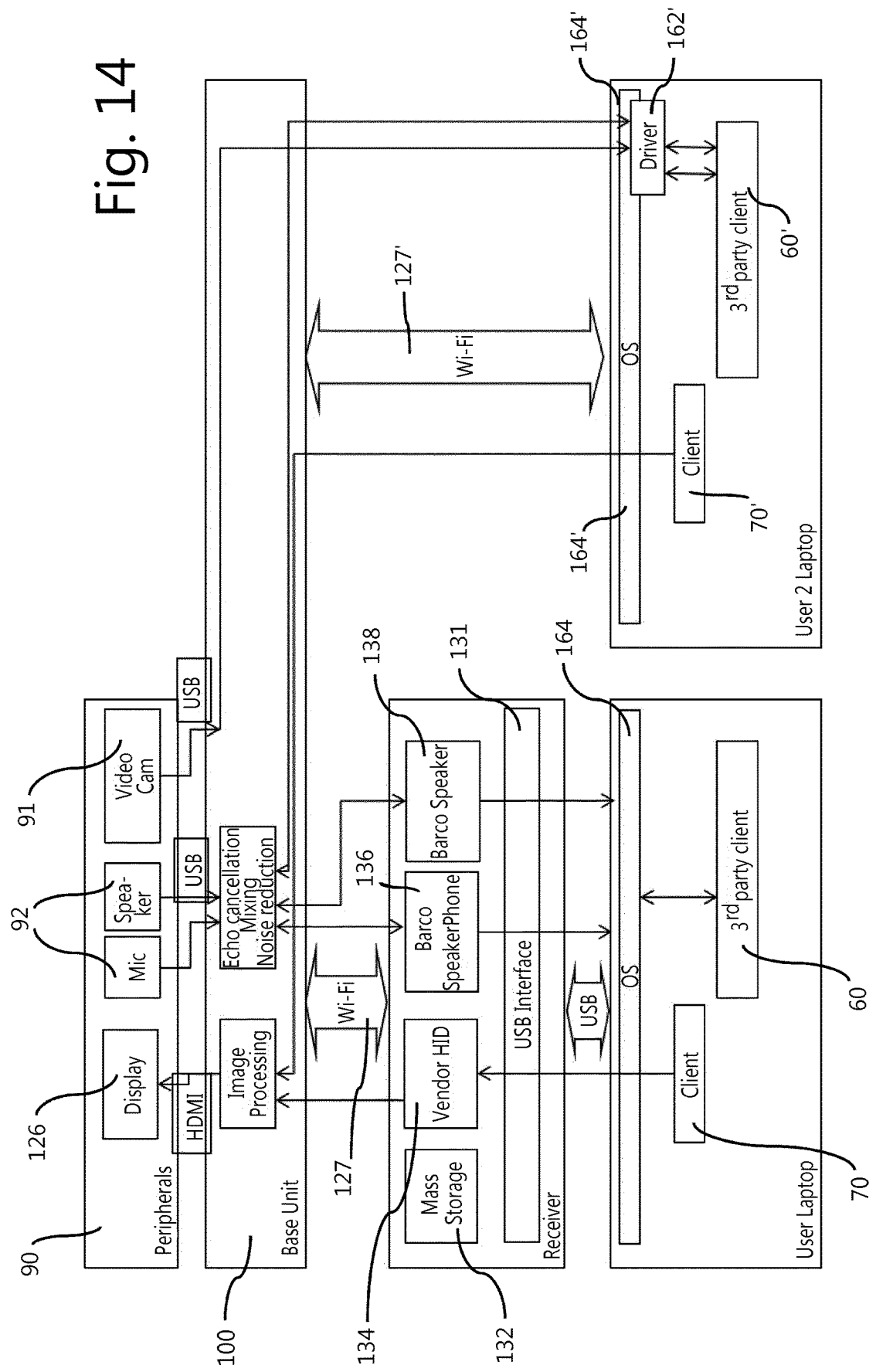

FIGS. 12 to 14 relate to embodiments of the present invention in which there are multiple users. First of all, each participant in a meeting can make use of any of the embodiments described in FIGS. 8 to 11. Thus, the present invention provides multiuser solutions.

In FIG. 12 the processing device 160' has no first peripheral device 130, e.g. none is available. In such a case client software 70' can be adapted to interact directly with base unit 100 over a wireless connection 127' and the client software 70' is adapted to provide any simulations, or translations as required to present the display device 126 to the processing unit 160' and to allow interaction therewith. The client software 70' can be adapted to simulate any of the embodiments described with respect to FIGS. 1 to 11 without however using a first peripheral device 130. The client software 70' can simulate for example a UB interface of the type used in any of the embodiments of FIGS. 1 to 11. For the processing device 160', the methods described with respect to any of FIGS. 1 to 11 can be used.

In FIG. 13 the processing device 160' has no first peripheral device 130, e.g. none is available. In such a case client software 70' can be adapted to interact directly with base unit 100 over a wireless connection 127' and the client software 70' is adapted to provide any simulations, or translations as required to present the display device 126 to the processing unit 160' and to allow interaction therewith exactly as described with respect to FIG. 12. However, group 90 has a microphone and speaker combination such as a speakerphone 92 or a microphone and speaker combination 96, 97. Processing device 160' can make use of any of the embodiments of FIGS. 1 to 11. The client software 70' of processing device 160' can be adapted to provide video data directly to the base unit 100 where it is processed, e.g. decoded and composited and provided to display 126 over a suitable connection such as an HDMI connection.

For the processing device 160' the client software 70' and a driver 162' can present a simulated speakerphone 92 to the OS 164' thus creating a virtual microphone and a virtual speaker. The third party software 60' for the Unified Communication such as the Skype™ call will be presented with these virtual devices which it then uses for the call.

In FIG. 14 the processing device 160' has no first peripheral device 130, e.g. none is available. In such a case client software 70' can be adapted to interact directly with base unit 100 over a wireless connection 127' and the client software 70' is adapted to provide any simulations, or translations as required to present the display device 126 to the processing unit 160' and to allow interaction therewith exactly as described with respect to FIG. 13. However, group 90 has a videocam 91 connected e.g. via a USB connection to the base unit 100. Processing device 160' can make use of any of the embodiments of FIGS. 1 to 11. The client software 70' of processing device 160' can be adapted to receive video data directly from the base unit 100.

For the processing device 160' the client software 70' and a driver 162' can present a simulated videocam 91 to the OS 164' thus creating a virtual videocam device. The third party software 60' for the Unified Communication such as the Skype™ call will be presented with all of the virtual devices which it then uses for the call.

Figure 15:
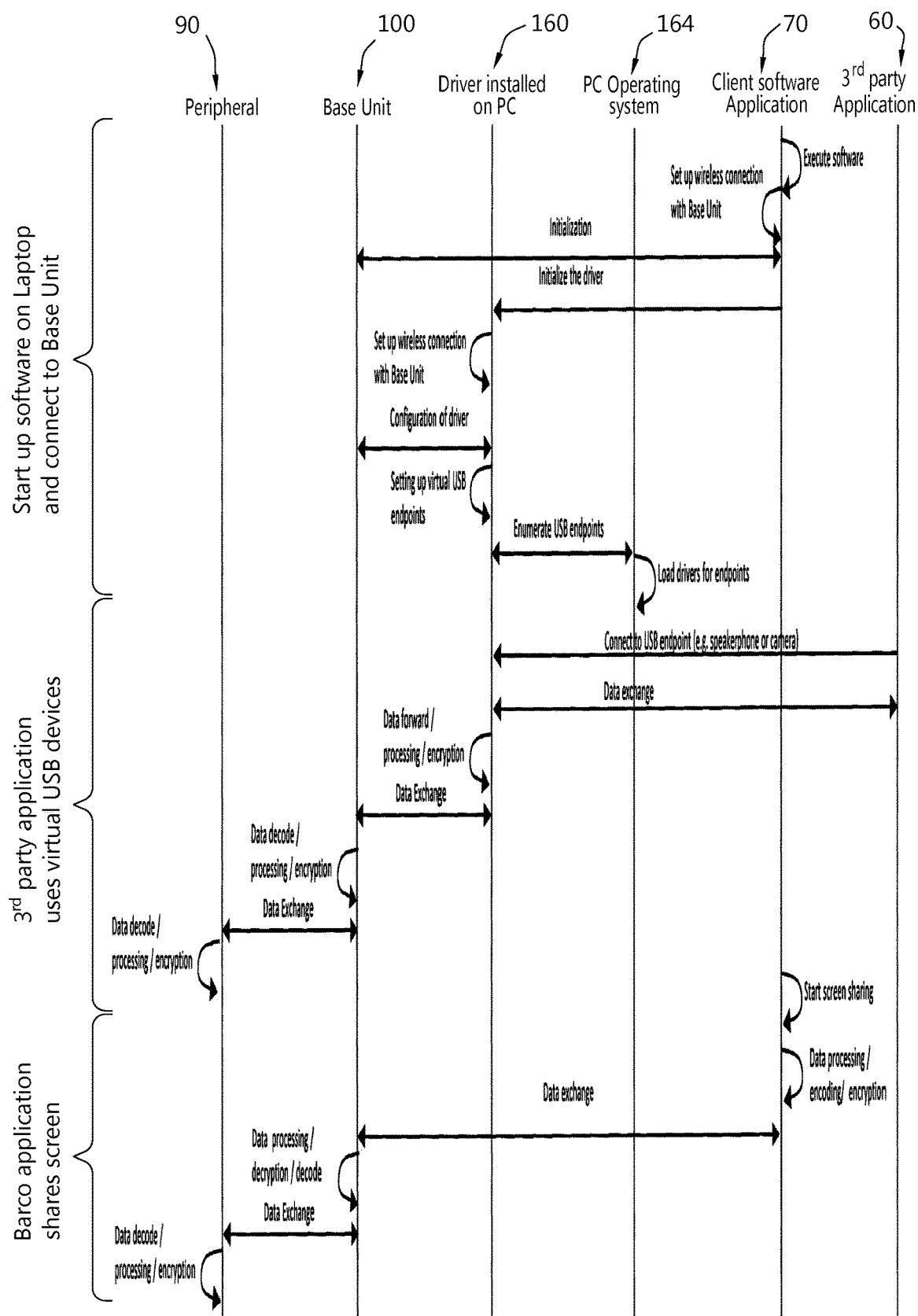
FIG. 15 shows a message flow for use with any of the embodiments 1 to 11 and 17 according to an embodiment of the present invention.

FIG. 15 shows a messaging flow diagram applicable to any of the embodiments described with respect to FIGS. 1 to 11.

Figure 16:
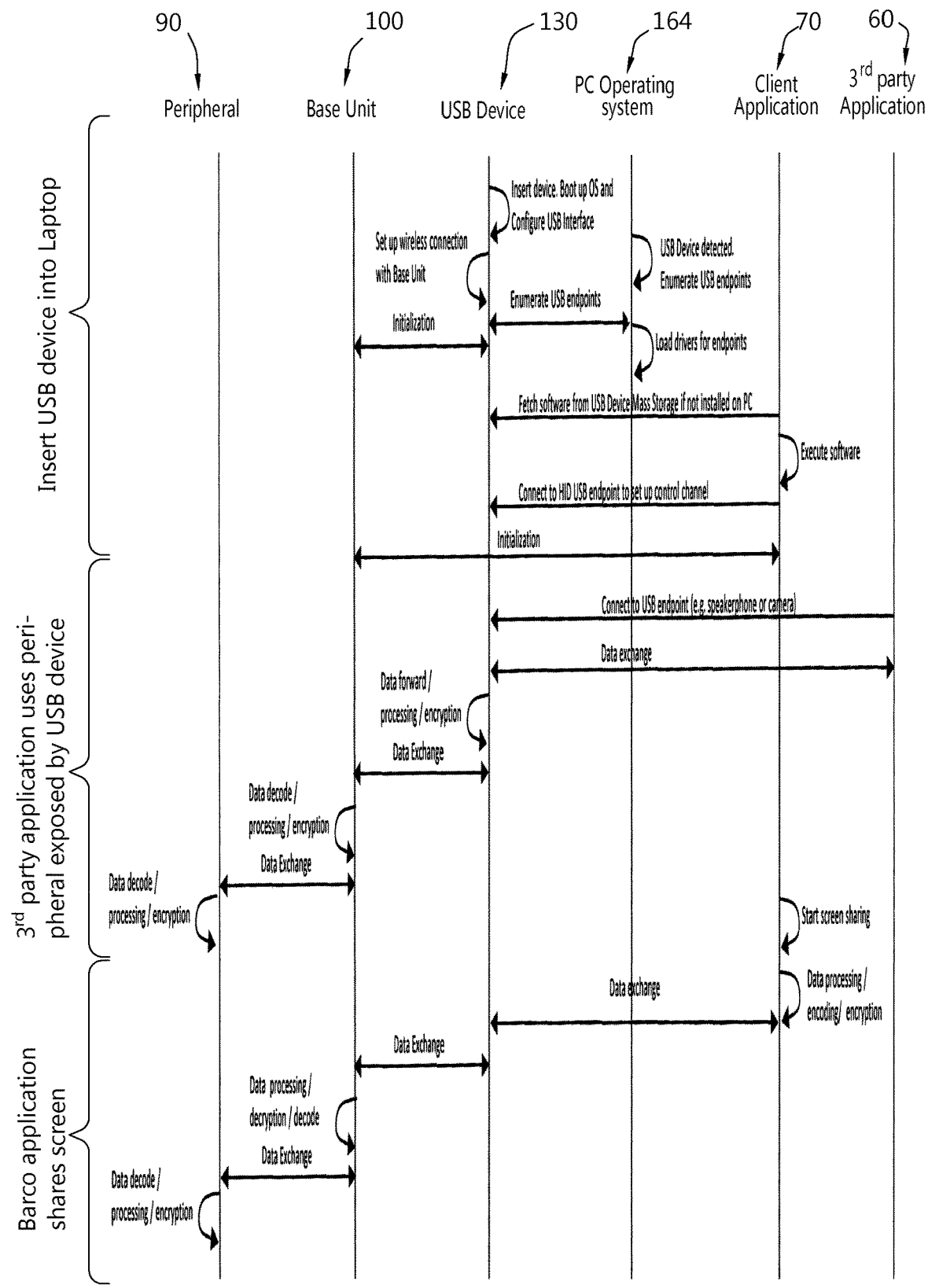
FIG. 16 shows a message flow for use with any of the embodiments 12 to 14 according to an embodiment of the present invention.

FIG. 16 shows a messaging flow applicable to any of the embodiments described with respect to FIGS. 12 to 14 where no first peripheral device is used.

Figure 17:
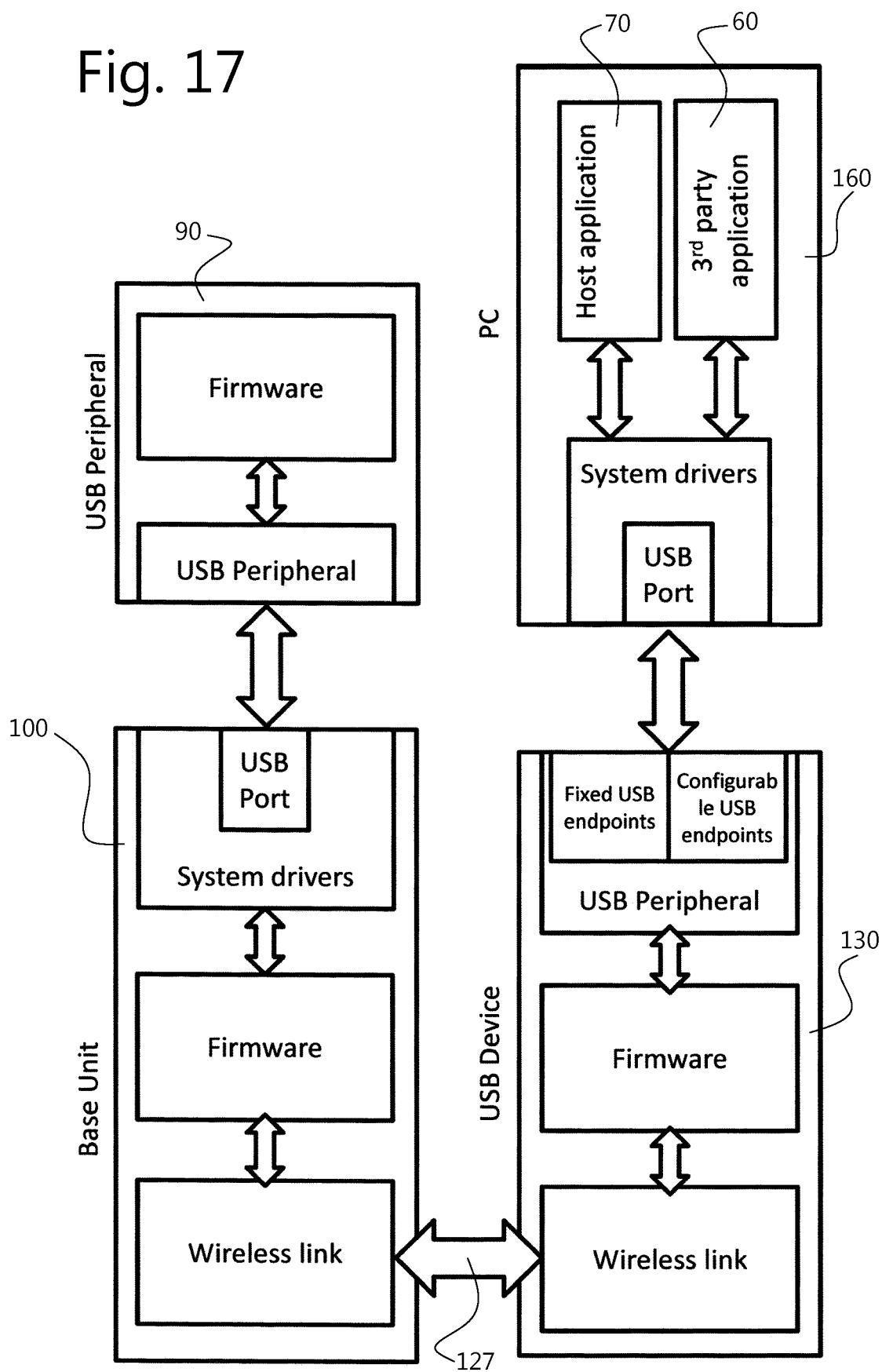
FIG. 17 shows a further embodiment of the present invention.

FIG. 17 shows a further embodiment of the present invention comprising a processing device 160 with a processor and memory and executing and optionally storing a client software 70 comprising also a host application as well as a third party application 60 which can be adapted to execute a unified communications call such as a Skype™ call or a Skype™ for business call. The processing device 160 has a serial port such as a USB port and generic or custom drivers for communicating across the port with a first peripheral device 130. The peripheral device 130 has a processor and memory and executes and optionally stores firmware which provides a wireless link 127 to a base unit 100 as well as providing at least one configurable or fixed endpoint of a functional device 90 which is connected to or is connected in the base unit 100. The base unit has a processor and a memory for executing and optionally storing firmware for providing a connection to the wireless link 127 and also to provide a port to the functional device 90. The functional device 90 has a processor and memory and executes and optionally stores firmware for providing the link and interface to the base unit 100 and for providing data to be sent to the at least one configurable or fixed endpoints on the peripheral device 130.

Methods according to the present invention can be performed by a computer system. The present invention can use a processing engine to carry out functions. The processing engine preferably has digital processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

A processing device may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention, e.g. as itemised below when the software is loaded onto a computer and executed on one or more processing engines such as microprocessors, ASIC's, FPGA's etc. Hence any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows™ supplied by Microsoft Corp, USA, Linux, Android or similar. The computer system can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.: connecting a processing device to a functional device connected to or in a base unit of a communications network, the processing device having a memory, a display and an operating system, the base unit having a transmitter and the first peripheral device having a receiver;

coupling a first peripheral device to the processing device via a generic communications protocol, providing at least one fixed or a configurable endpoint of the functional device exposed on the first peripheral device;

transmitting data from the base unit and receiving the data at the first peripheral device over the communications network from the functional device to the processing device via the at least one fixed or configurable endpoint using the generic communications protocol for communication between the processing device and the first peripheral device.

The software embodied in the computer program product is adapted to carry out the following functions when the software is loaded onto the respective device or devices and executed on one or more processing engines such as microprocessors, ASIC's, FPGA's etc.:

Transmitting or receiving data, i.e. streaming data carrying images, audio, etc. in a raw or unaltered format;

Connecting the functional device to or in a base unit of a wireless communications network;

Running the functional device with the vendor specific driver alone.

The software embodied in the computer program product is adapted to carry out the following functions when the software is loaded onto the respective device or devices and executed on one or more processing engines such as microprocessors, ASIC's, FPGA's etc.:

exposure implemented with descriptor fields;

transmitting the data from the functional device to at least two processing devices using at least two first peripheral devices;

combining and exposing two endpoints to the processing device as one endpoint.

The software embodied in the computer program product is adapted to carry out the following functions when the software is loaded onto the respective device or devices and executed on one or more processing engines such as microprocessors, ASIC's, FPGA's etc.:

the functional device enables one or more of a microphone, a speakerphone, a speaker, a display, a touchscreen, a projector, a camera, a video camera, a webcamera;

presenting the at least one fixed or a configurable endpoint of the functional device exposed on the first peripheral device as one of a human interface device, a mass storage device, a composite device, a microphone, a speakerphone, a speaker, a display, a touchscreen, a projector, a camera, a video camera, or a webcamera.

The software embodied in the computer program product is adapted to carry out the following functions when the software is loaded onto the respective device or devices and executed on one or more processing engines such as microprocessors, ASIC's, FPGA's etc.:

encoding, and/or optionally encrypting the data;

hosting a unified communication between two or more further processing devices on the processing device;

the first peripheral device presenting a functional device to the unified communication between two or more processing devices; or exposing the same type of functional device to the processing device as is connected to the Base Unit and using at least one driver for the functional device installed on the processing device.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The invention claimed is:

1. A system for connecting a processing device to a functional device connected to or in a base unit of a wireless connection, the system comprising:

the base unit having a transmitter, a first display device connected to or in the base unit, at least one functional device connected to or in the base unit, and the processing device having a memory, a second display device, an operating system, a third party software for a Unified Communication call, a driver and a client software, when executed on the processing device, is configured to have the processing device interact directly with the base unit over a wireless connection, wherein the base unit, via the transmitter, is configured to transmit data over the wireless connection to the processing device, wherein the client software, when executed by a processor of the processing device, is configured to provide any simulations or translations, as required, to allow interaction between the first display device and the processing device, and wherein the client software and the driver, when executed on the processing device, are configured to present the at least one functional device to the operating system of the processing device as a virtual functional device, and the third party software for the Unified Communication call is presented with the virtual functional device for the Unified Communication call, the processing device being configured to host the Unified Communication between two or more other processing devices, and wherein the client software is further configured to provide data transformations based on a type of functional data from the at least one functional device to the processing device.

2. The system of claim 1, wherein the client software and the driver are configured to present a simulated speakerphone to the operating system to create a virtual microphone and a virtual speaker.

3. The system of claim 1, wherein the client software and the driver are configured to present a simulated videocam to the operating system to create a virtual videocam device.

4. The system of claim 1, wherein the client software is configured to provide video data, optionally obtained by screen scraping, directly to the base unit, wherein the base unit processes the video data.

5. The system of claim 1, wherein the functional data includes video data received from the base unit via the transmitter over the wireless connection.

6. The system of claim 5, wherein the data transformations of the video data comprises decoding and compositing or decrypting the video data.

7. The system of claim 1, wherein the at least one functional device which is presented to the operating system as a virtual functional device, is one or more of a data capturing device, a microphone, a speakerphone, a speaker, another display, a touchscreen, a projector, a camera, a video camera, and a webcamera.

8. The system of claim 1, further comprising means for encoding, optionally encrypting the data in the base unit or the processing device.

9. The system of claim 1, wherein the virtual functional device is presented to the unified communication between the two or more other processing devices.

10. The system of claim 1, further comprising at least one fixed or a configurable endpoint of the virtual functional device, wherein the at least one fixed or a configurable endpoint is a data source or a data sink which is configured to store or emit data of the virtual functional device.

11. A method for connecting a processing device to a functional device connected to or in a base unit of a communications network, the base unit having a transmitter and a first display device, the processing device having a memory, a second display device and an operating system, a third party software for a Unified Communication call, and a driver and a client software wherein, the client software, when executed by a processor on the processing device:
- interacts directly with the base unit over a wireless connection and provides any simulations or translations, as required, to allow interaction between the first display device and the processing device, wherein the base unit transmits data over the wireless connection to the processing device,
- the client software and a driver, when executed on the processing device, present the functional device to the operating system of the processing device as a virtual functional device,
- third party software for a Unified Communication call is presented with the virtual functional device which it then uses for the call,
- wherein the processing device hosts the Unified Communication call between two or more processing devices,
- wherein the client software is further configured to provide data transformations based on a type of functional data from the at least one functional device to the processing device.

12. The method of claim 11, wherein the client software and the driver present a simulated speakerphone to the operating system thus creating a virtual microphone and a virtual speaker.

13. The method of claim 11, wherein the client software and a driver present a simulated videocam to the operating system thus creating a virtual videocam device.

14. The method of claim 11, wherein the functional data includes video data, optionally obtained by screen scraping, directly to the base unit where it is processed.

15. The method of claim 14, wherein the data transformations comprises decoding and compositing or decrypting the video data and providing the video data to the first display device.

16. The method of claim 11, wherein the functional device which is presented to the operating system as the virtual functional device is any one or more of a data capturing device, a microphone, a speakerphone, a speaker, another display, a touchscreen, a projector, a camera, a video camera, a webcamera.

17. The method of claim 11, further comprising encoding, optionally encrypting the data.

18. The method of claim 11, wherein the virtual functional device is presented to the unified communication between the two or more other processing devices.

19. The method of claim 11, further exposing a same type of functional device to the processing device as is connected to the base unit which is presented to the operating system as a virtual functional device.

20. The method of claim 11, further comprising at least one fixed or a configurable endpoint of the virtual functional device, wherein the at least one fixed or a configurable endpoint is a data source or a data sink which stores or emits data of the virtual functional device.

21. The method of claim 12, wherein the interaction directly with the base unit further includes presenting the first display device to the processing device.

22. The system of claim 1, wherein the interaction directly with the base unit further includes presenting the first display device to the processing device.

\* \* \* \* \*